US010924709B1

(12) United States Patent
Faulkner et al.

(10) Patent No.: US 10,924,709 B1
(45) Date of Patent: Feb. 16, 2021

(54) DYNAMICALLY CONTROLLED VIEW STATES FOR IMPROVED ENGAGEMENT DURING COMMUNICATION SESSIONS

(71) Applicant: Microsoft Technology Licensing, LLC, Redmond, WA (US)

(72) Inventors: Jason Thomas Faulkner, Seattle, WA (US); Ruchir Astavans, Redmond, WA (US); Kevin Daniel Morrison, Arlington, MA (US); Timur Aleshin, Redmond, WA (US); Chad A. Voss, Redmond, WA (US); Amey Parandekar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/729,255

(22) Filed: Dec. 27, 2019

(51) Int. Cl.
  *H04N 7/15* (2006.01)
  *G06K 9/00* (2006.01)
  *G06F 3/0484* (2013.01)
  *H04L 29/06* (2006.01)

(52) U.S. Cl.
  CPC ............ *H04N 7/15* (2013.01); *G06F 3/0484* (2013.01); *G06K 9/00664* (2013.01); *H04L 65/1089* (2013.01); *H04L 65/1093* (2013.01)

(58) Field of Classification Search
  CPC .. H04N 7/15; G06K 9/00; H04L 29/06; G06F 3/0484
  USPC .............................. 348/14.01–14.16; 715/753
  See application file for complete search history.

(56) References Cited

U.S. PATENT DOCUMENTS

| | | | |
|---|---|---|---|
| 7,554,571 B1 | 6/2009 | Beck et al. | |
| 8,350,891 B2 | 1/2013 | Khot et al. | |
| 8,379,077 B2 | 2/2013 | Wu et al. | |
| 9,088,694 B2 | 7/2015 | Navon et al. | |
| 9,148,627 B2 | 9/2015 | Anderson et al. | |
| 9,369,672 B2 | 6/2016 | Hiller et al. | |
| 9,467,657 B2 | 10/2016 | Decker et al. | |
| 9,736,395 B2 | 8/2017 | Ramon | |

(Continued)

OTHER PUBLICATIONS

"About Sync Settings on Windows 10 devices", Retrieved from: https://web.archive.org/web/20190906210836/https:/support.microsoft.com/en-us/help/4026102/windows-10-about-sync-settings, Retrieved Date: Sep. 6, 2019, 2 Pages.

(Continued)

*Primary Examiner* — Melur Ramakrishnaiah

(74) *Attorney, Agent, or Firm* — Newport IP, LLC; Scott Y. Shigeta

(57) ABSTRACT

The techniques disclosed herein improve user engagement and more efficient use of computing resources by providing dynamically controlled view states for communication sessions based on a number of people depicted in shared video streams. In some configurations, a system can control the size and position of a video rendering based on the number of individuals depicted in a video stream. In some configurations, a stream depicting a threshold number of people can be rendered in the primary display area and other streams can be rendered in a secondary section. The primary area can be sized to scale a video depicting multiple people video to equalize the size of the people with renderings of single-person video streams. This helps a system provide a more granular level of control to equalize the representation of each person displayed within different video streams.

20 Claims, 15 Drawing Sheets

(56) References Cited

U.S. PATENT DOCUMENTS

| | | |
|---|---|---|
| 9,781,385 B2 | 10/2017 | Ma et al. |
| 9,800,831 B2 | 10/2017 | Diao |
| 9,876,989 B2 | 1/2018 | Noy et al. |
| 10,321,093 B2 | 6/2019 | Duckworth et al. |
| 10,362,272 B1 | 7/2019 | Van et al. |
| 2005/0259144 A1 | 11/2005 | Eshkoli |
| 2007/0200923 A1 | 8/2007 | Eleftheriadis et al. |
| 2007/0300165 A1 | 12/2007 | Haveliwala |
| 2010/0002069 A1 | 1/2010 | Eleftheriadis et al. |
| 2011/0249074 A1* | 10/2011 | Cranfill .............. G06F 3/04886 348/14.02 |
| 2012/0062473 A1 | 3/2012 | Xiao et al. |
| 2012/0249877 A1 | 10/2012 | Hernandez costa et al. |
| 2013/0106988 A1 | 5/2013 | Davis et al. |
| 2016/0308920 A1 | 10/2016 | Brunsch et al. |
| 2018/0014049 A1 | 1/2018 | Griffin et al. |
| 2018/0150433 A1 | 5/2018 | Sowden et al. |
| 2018/0152737 A1 | 5/2018 | Mathur et al. |
| 2018/0191965 A1* | 7/2018 | Faulkner .............. H04N 5/2628 |
| 2019/0342519 A1* | 11/2019 | Van Os .................. G06F 9/542 |

OTHER PUBLICATIONS

"Changing Your Own Video Layout", Retrieved from: https://documentation.avaya.com/bundle/UsingXTSeries_r91/page/xt1000_ug_calls_changeVideoLayout.html, Retrieved Date: Sep. 17, 2019, 4 Pages.

"Using Dual Monitors with the Zoom Desktop Client", Retrieved from: https://support.zoom.us/hc/en-us/articles/201362583-Using-Dual-Monitors-with-the-Zoom-Desktop-Client?mobile_site=true, Retrieved Date: Sep. 17, 2019, 3 Pages.

"ViewSplit-Display Layout Software", Retrieved from: https://web.archive.org/web/20170318042724/https:/www.viewsonic.com/us/viewsplit.html, Retrieved Date: Mar. 18, 2017, 4 Pages.

"Non Final Office Action Issued in U.S. Appl. No. 16/743,391", dated Jul. 20, 2020, 10 Pages.

"Final Office Action Issued in U.S. Appl. No. 16/729,272", dated Oct. 8, 2020, 8 Pages.

"Non-Final Office Action Issued in U.S. Appl. No. 16/729,272", dated Mar. 20, 2020, 8 Pages.

"Non-Final Office Action Issued in U.S. Appl. No. 16/729,286", dated Apr. 6, 2020, 10 Pages.

* cited by examiner

US 10,924,709 B1

DYNAMICALLY CONTROLLED VIEW STATES FOR IMPROVED ENGAGEMENT DURING COMMUNICATION SESSIONS

BACKGROUND

There are a number of different communication systems that allow users to collaborate. For example, some systems allow people to collaborate by the use of live video streams, live audio streams, and other forms of text-based or image-based mediums. Participants of a communication session can share a video stream showing a single person or a group of people with a display of shared content. Such systems can provide participants of a communication session with an experience that simulates an in-person meeting.

Although there are a number of different types of systems that allow users to collaborate, such systems still have a number of shortcomings. For example, when an on-line meeting includes a number of video streams, e.g., some showing a single person and others showing a group of people, most existing systems display each stream in an arrangement that renders each stream having an equal size. In such an arrangement, a rendering showing a group of people may not show the same level of detail for each person as a rendering showing a single person. Such user interface arrangements may not optimally promote user engagement since participants may not be able to clearly see important gestures for each person equally. Such issues can discourage user engagement reduce the efficacy of a communication session, particularly when a person may not be perceived as an equal to others merely because of a display arrangement.

Software applications that do not promote user engagement can lead to production loss and inefficiencies with respect to computing resources. For instance, participants of a communication session, such as an online meeting, may need to refer to recordings or other resources when content is missed or overlooked. Content may need to be re-sent when users miss salient points during a live meeting. Such activities can lead to inefficient use a network, processor, memory, or other computing resources. Also, when a participant's level of engagement is negatively impacted during a meeting, such a loss of production may cause a need for prolonged meetings or follow-up meetings, which in turn take additional computing resources. Such production loss and inefficiencies with respect to computing resources can be exacerbated when a system is used to provide a collaborative environment for a large number of participants.

In addition to a loss in user engagement, a number of other inefficiencies can result when communication systems do not effectively display a live video of a person. Participants can miss important social cues, e.g., when a person raises their hand, begins to speak, looks in a certain direction, etc. Such shortcomings sometimes require users to manually interact with a number of different systems. For example, some users still send text messages or emails to other participants while in a conference call if a cue was missed, etc. Such manual steps can be disruptive to a person's workflow and highly inefficient when it comes to helping a person establish a collaboration protocol with a group of people. Such drawbacks of existing systems can lead to loss of productivity as well as inefficient use of computing resources.

SUMMARY

The techniques disclosed herein improve user engagement and more efficient use of computing resources by providing dynamically controlled view states for communication sessions based on a number of people depicted in shared video streams. In some configurations, a system can control a view state, e.g., a size, position, or arrangement, of a video rendering based on the number of individuals depicted in a video stream. In some configurations, a primary area of a user interface is reserved for video feeds depicting a threshold number of people, and a secondary area of the user interface can be reserved for video feeds depicting fewer than the threshold number of people. In one illustrative example, the primary area of a user interface is reserved for video feeds depicting multiple people, other areas of the user interface are reserved for video feeds depicting a single person. The techniques disclosed herein provide an optimized user interface arrangement by analyzing the context of people depicted within a live stream or a recorded stream. This is an improvement over existing systems that typically display different types of video streams in a similar manner. One benefit of the presently disclosed techniques is to make the people depicted in a multi-person video stream appear to be the same size as people depicted in single-person video streams. This sometimes requires a rendering of a multi-person video stream to be larger than a rendering of a single-person video stream. This adjustment in the size of each stream helps a system provide more control of a display arrangement to equalize the representation of each person displayed within a user interface. The features disclosed herein help promote user engagement for presenters and viewers by making the actions of each person in a multi-person video easier to visualize, and in some embodiments, equalize the display of people in a multi-person video with the display of people in single-person video streams. The techniques can also apply to any identified object within a video stream, as the techniques are not just limited to identifying the number of people depicted in a video stream.

In addition to being displayed in a designated display area, video streams depicting the threshold number of people can also be scaled to increase the size of at least one person to equalize the size of people within a multi-person video with a size of a person in a single-person video. The scaling can be done in a number of different ways. For instance, a scaling factor can be applied to video streams depicting a threshold number of people. The value of the scaling factor can be based on a ratio of people depicted in different streams. For example, a system may compare the number of people depicted in a stream having a threshold number of people with the number of people in a video stream having fewer than the threshold number of people. A difference between the two numbers can be used to determine a scaling factor for either stream. In another example, a video stream depicting a threshold number of people can be increased in size by being positioned within a primary display area having a size that is larger than a secondary display area. The primary display area and the secondary display area can be sized according to a predetermined ratio to accommodate a number of different scenarios. For instance, a primary display area and a secondary display area may be sized to render a selected video stream for the primary display area at twice or three times the size of a video stream shown in the secondary display area. A system may generate a user interface having a primary section and a secondary section, where the primary section has a position and a size that is more visually prominent than the secondary section.

In some configurations, a unique scaling factor can be applied to individual renderings of each stream. A scaling factor can be selected for each stream to equalize at least one dimension of a physical feature of two or more people depicted in different streams. One dimension can include a width and/or height of a person's face, head, crown or any other dimension that can be measured by an analysis of a video image of a person. For instance, consider a scenario where a first rendering depicts two people and a second rendering depicts one person. In this example, without the application of a scaling factor, the renderings show that the people in the two-person video appear to be smaller, e.g., half the size as the person in the single-person video. In an effort to equalize the size of the display of each person, a scaling factor can be selected to increase the size of the rendering, which may include cropping edges from the image, of the two-person video. In addition, or alternatively, another scaling factor can be selected to reduce the size of the rendering of the single-person video.

In some configurations, a scaling factor for each video can be selected based on the number of people depicted in each video. The selection of the scaling factors can be linear or non-linear. For instance, a two-person video may be scaled up by two times, and a three-person video can be scaled up by three times, etc. Alternatively, a two-person video may be scaled up by 1.75 times the size, and a three-person video can be scaled up by 2.15 times the size, etc. In another embodiment, a scaling factor for each video can be selected based on dimension of at least one physical feature of a depicted person. For instance, if one person in a two-person video has a measurement of 2 units of measure from the top of their head to their chin, and a person in a one-person video has a measurement of 4 units of measure from the top of their head to their chin, the two-person video may be scaled up by a factor of two. Other scaling factors may be selected based on the measurements depending on a desired outcome. By equalizing, or at least partially equalizing, at least one dimension of individual users depicted in each stream, the system can help improve user engagement by allowing viewers see details of displayed gestures and mitigating any visual favoritism that can result from people being displayed at different sizes.

The examples described herein are provided within the context of collaborative environments, e.g., private chat sessions, multi-user editing sessions, group meetings, live broadcasts, etc. For illustrative purposes, it can be appreciated that a computer managing a collaborative environment involves any type of computer managing a communication session where two or more computers are sharing video data, both recorded and live video streams. In addition, it can be appreciated that the techniques disclosed herein can apply to any user interface arrangement that is used for displaying content. The scope of the present disclosure is not limited to embodiments associated with collaborative environments.

The techniques disclosed herein provide a number of features that improve existing computers. For instance, computing resources such as processor cycles, memory, network bandwidth, and power, are used more efficiently as a system can dynamically control the size, position, and shape of video streams depicting a threshold number of people. By providing dynamically controlled user interfaces that provide more visual details for objects of interest, the techniques disclosed herein can provide more efficient use of computing resources. The system can improve user interaction with a computing device by mitigating the need for additional communication systems, as the disclosed system can mitigate or eliminate the need for requests for content to be re-sent, repeated, etc. Improvement of user interactions with a device can also lead to the reduction of unnecessary or redundant inputs, which can mitigate inadvertent inputs, corrected inputs, and other types of user interactions that utilize computing resources. Other technical benefits not specifically mentioned herein can also be realized through implementations of the disclosed subject matter.

Those skilled in the art will also appreciate that aspects of the subject matter described herein can be practiced on or in conjunction with other computer system configurations beyond those specifically described herein, including multiprocessor systems, microprocessor-based or programmable consumer electronics, augmented reality or virtual reality devices, video game devices, handheld computers, smartphones, smart televisions, self-driving vehicles, smart watches, e-readers, tablet computing devices, special-purpose hardware devices, networked appliances, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description is directed to techniques for improving user engagement and more efficient use of computing resources by providing dynamically controlled view states for communication sessions based on a number of people depicted in video streams. In some configurations, a system can control the size and position of a video rendering based on the number of individuals depicted in a video stream. In some configurations, a user interface includes a primary display area reserved for video feeds depicting multiple people, other display areas reserved for video feeds depicting fewer than a threshold number of people. Additional details of a system for controlling a size and position of a rendering of a video stream depicting a threshold number of people are described below and shown in the examples described in association with FIGS. 1A-1D.

Figure 1A:
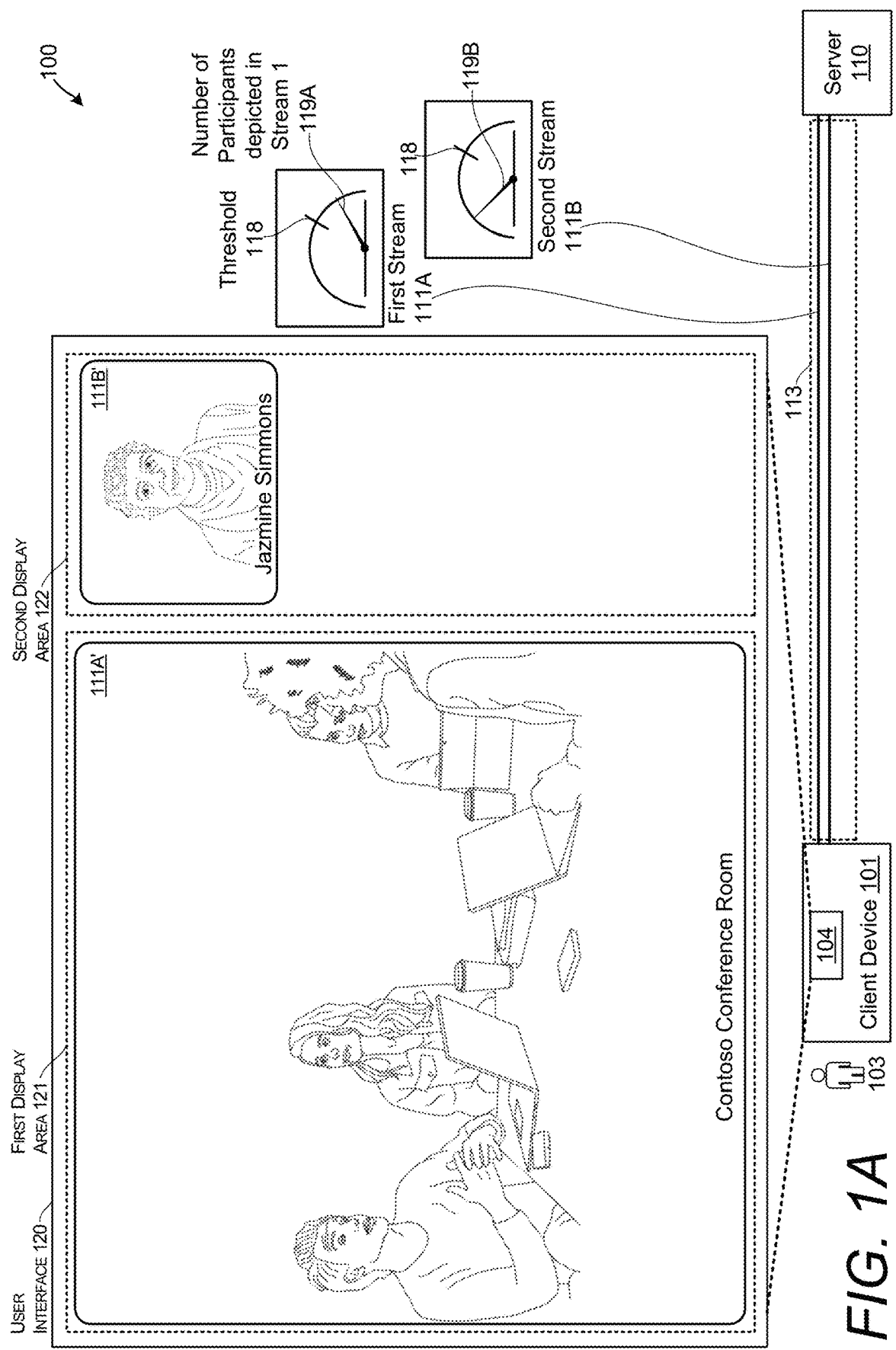
FIG. 1A illustrates aspects of a communication system for configuring a user interface arrangement based on a number of people depicted in the video stream.

FIG. 1A illustrates aspects of a system 100 for configuring a user interface arrangement based on a number of people depicted in a video stream. The system 100 can include a server 110 and at least one client device 101 associated with a user 103. The server 110 can manage a number of data streams having a video component and an audio component allowing the client device 101 to communicate with a number of other remote client devices. Additional aspects of the server 110 managing communication sessions between client computers are described in additional detail below with reference to the system 602 shown in FIG. 6. Additional aspects of the client device 101 are also described in more detail below with reference to the devices 606 shown in FIG. 6.

In some configurations, the server 110 can analyze a number of streams 111 to identify select streams having a video component depicting at least a threshold 118 number of individuals 119A. In some configurations, the select streams, which in this example includes the first stream 111A, have a video component depicting a number of individuals 119A that meet or exceed a threshold 118. In some configurations, the threshold can be a predetermined number. For instance, a predetermined number can be three (3). Thus, when a stream has a video component that depicts at least three people, that video stream can be selected and distinguished from other streams. In this example, the first stream 111A is selected and a rendering 111A' of the first stream 111A is positioned in a first display area 121 (primary display area). The other streams that do not have a threshold number of people, such as the second stream 111B, have a rendering 111B' that is positioned in a second display area 122 (secondary display area).

The first display area can be larger in size and positioned in a more central location within a user interface 120. The first display area can have a dimension, such as a side, that is sized at a predetermined ratio over a dimension of the second display area. The ratio can be based on the threshold used to select threads for display within the first display area. For example, if the threshold is three (3) people, the width of the first display area 121 can be three times the width of the second display area 122.

A number of different technologies for determining a number of individuals depicted within a video component of a stream can be utilized. In one illustrative example, a suitable facial recognition technology can be utilized to identify individuals within a video component of a stream. In other examples, other technologies that identify predetermined shapes and/or various forms of movement can be utilized to determine the number of individuals depicted within a video component of a stream. Such recognition techniques may be utilized by any suitable computing device, such as the server 110, any client device 101, or a combination thereof. Once individuals are identified and counted, the system can generate metadata indicating a number of individuals depicted within a video stream. When generated at the server 110, the metadata, which can be included in the communication session data 113, may be communicated from the server 110 to the client device 101. The client device can utilize the metadata to determine an arrangement of a user interface and a position and size of each stream rendering within the user interface.

The metadata can identify a number of people depicted in a video and a description characterizing roles of people associated with the stream. The roles or other data indicating a priority for each individual can cause a computer to arrange the rendering of each stream based on a ranking or role of the individuals depicted in the streams. Metadata can also characterize certain streams, e.g., indicate that a number of people are audience members or presenters. Such metadata can be utilized to select a display region for different types of media content. For instance, although a video may have hundreds of people depicted in a video component, the video may not be selected for the first display area 122 because the people depicted in the video component are characterized as an audience and not as presenters.

As shown in FIG. 1A, the server 120 can communicate the session data 113 and one or more streams to a number of remote devices, including the client device 101. The session data 113 and one or more streams 111 cause one or more remote computers to generate a user interface data 104 defining a user interface 120 having a first display area 121 and a second display area 122. The first display area 121 is reserved for a rendering 111A' of select streams, e.g., the first stream 111A, having the video component depicting at least the threshold number 118 of individuals 119A. The session data 113 can cause renderings 111B' for other streams, such as the second stream 111B, that do not depict a threshold number of individuals, within the second display area 122.

Figure 1B:
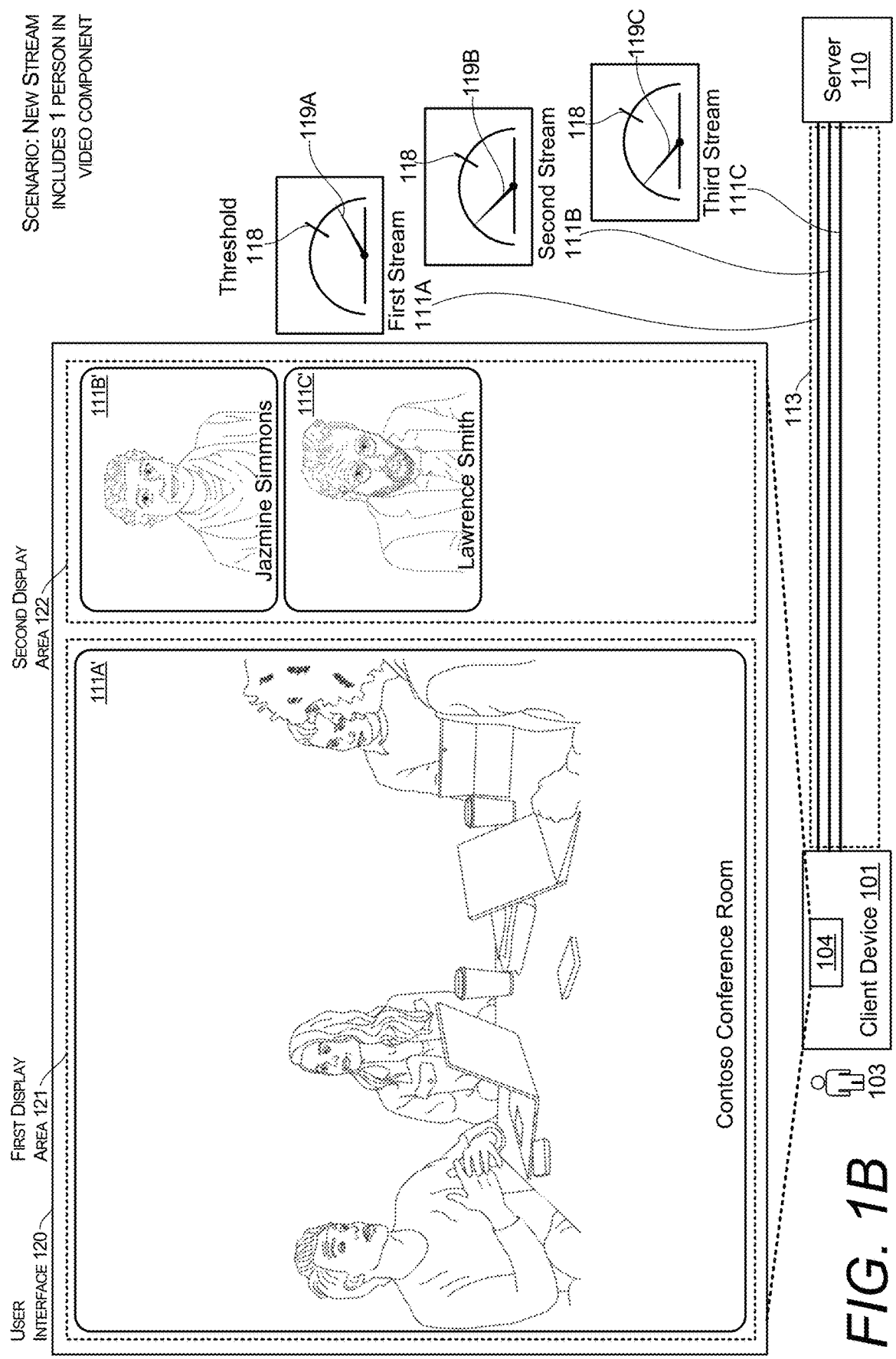
FIG. 1B illustrates aspects of a communication system used in a scenario where a new stream having fewer than a threshold number of people is added to a communication session.

FIG. 1B illustrates aspects of the system in a scenario where a new stream having fewer than a threshold number of individuals is added to the communication session. In such a scenario, the server 110 and/or the client device 101 detect the addition of a new stream 111C. The new stream 111C is then analyzed to determine that the number of individuals 119C depicted in the video component of the new stream 111C is less than the threshold 118. In response to determining that the number of individuals 119C does not exceed the threshold 118, the server 120 or the client can configure the communication session data 113 to cause at least one client computing device, such as client device 101, to display a rendering 111C' of the new stream 111C within the second display area 122.

Figure 1C:
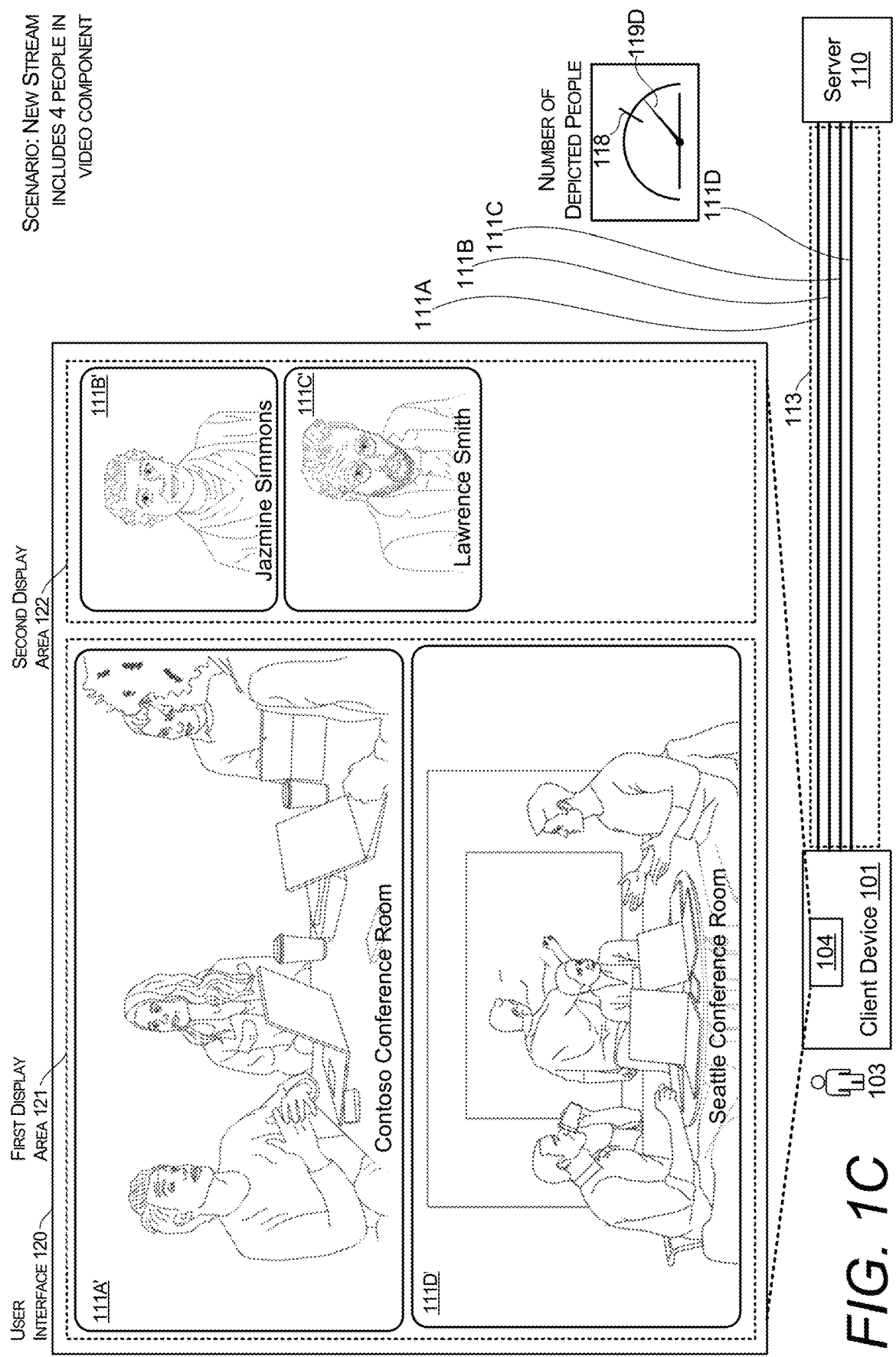
FIG. 1C illustrates aspects of a communication system used in a scenario where a new stream having a threshold number of people is added to a communication session.

FIG. 1C illustrates aspects of the system 100 in a scenario where a new stream having a threshold number of people is added to a communication session. In such a scenario, the server 110 and/or the client device 101 detect the addition of a new stream 111D. The new stream 111D is then analyzed to determine that the number of individuals 119D depicted in the video component of the new stream 111D meets or exceeds a threshold 118. In response to determining that the number of individuals 119D meets or exceeds the threshold 118, the server 120 or the client can configure the communication session data 113 to cause at least one client computing device, such as client device 101, to display a rendering 111D' of the new stream 111D within the first display area 121.

The embodiments disclosed herein may utilize policy data to determine an arrangement for a user interface and the size and position of individual renderings of one or more video streams. For instance, a policy may indicate that a primary area of a user interface is reserved for video feeds depicting a threshold number of people, and a secondary area of the user interface can be reserved for video feeds depicting fewer than the threshold number of people. In addition, a policy can define exceptions to this arrangement and allow the rendering of a video stream showing fewer than the threshold in the primary display area when one or more criteria is met. For instance, when there are no video streams depicting a threshold number of people, a system can apply an exception and allow the rendering of a stream having fewer than threshold number of people to be displayed within the primary display area. However, in such an embodiment, the system can remove the exception and exclusively reserve the primary area video streams depicting at least the threshold number of people when at least one video stream depicting a threshold number of people is detected.

An exception can also be applied when a user input provides an override. In yet another example, an exception can be applied when there are fewer than a minimum number of video streams depicting a threshold number of people. For instance, if the minimum number of video streams is two, and there is only one live video stream depicting the threshold number of people, the system may also allow a stream depicting only one person to be rendered within the primary display area. Such an exception may be applied until there are at least two video streams depicting the threshold number of people.

Figure 1D:
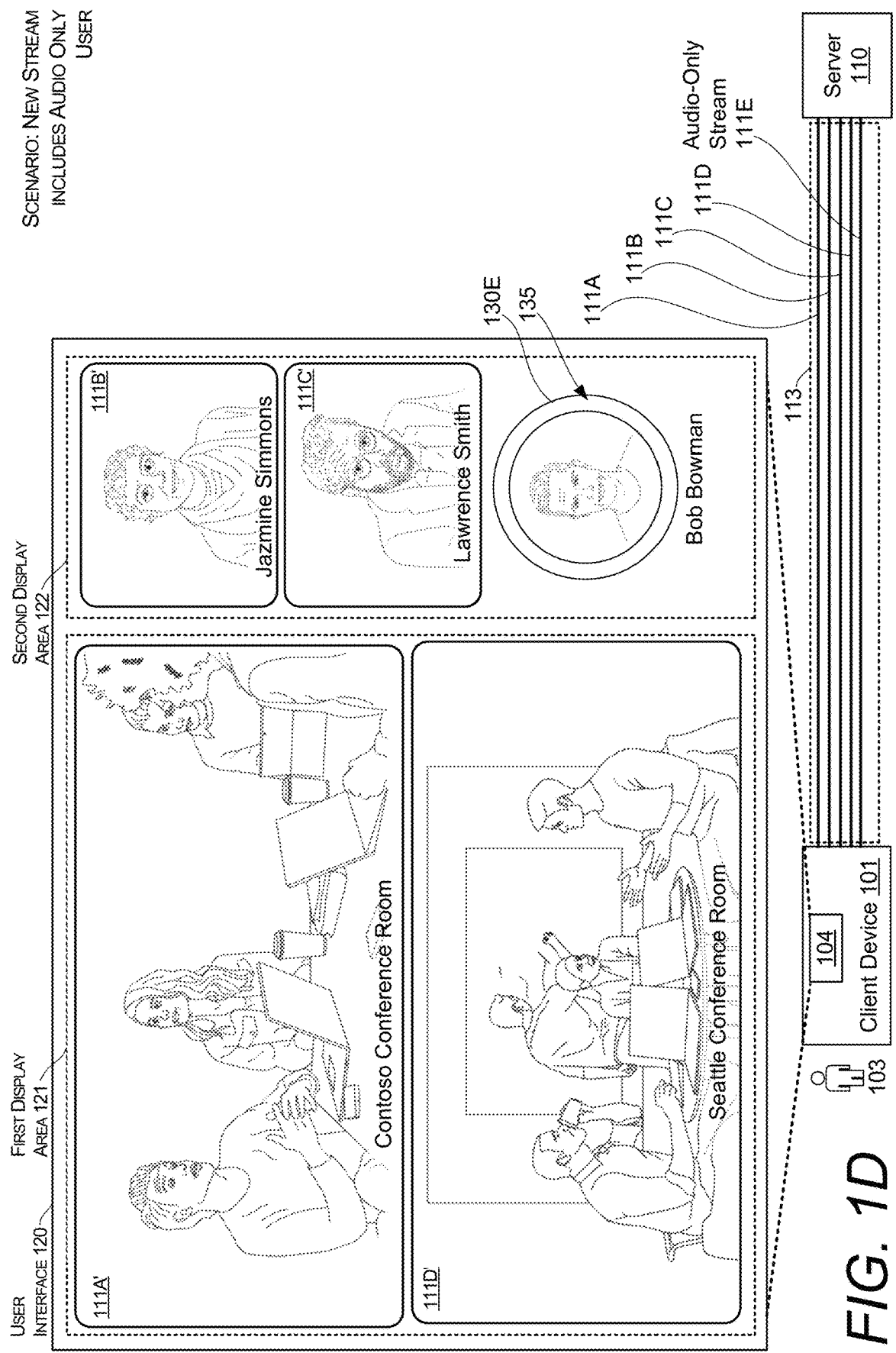
FIG. 1D illustrates aspects of a communication system used in a scenario where an audio-only stream is added to a communication session.

Referring now to FIG. 1D, an example scenario where an audio-only stream is added to a communication session is shown and described below. In such a scenario, the server 110 and/or the client device 101 can detect the addition of a new stream 111E. The new stream 111E is then analyzed to determine a stream type, which can include a first type, e.g., an audio and video stream, or a second type, e.g., an audio-only stream. In response to determining that the new stream 111E is an audio-only stream, the server 120 can configure the communication session data 113 to cause at least one client computing device to a display of a graphical element 111E' representing a person or object associated with the new stream 111E within the second display area 122. In another embodiment, in response to determining that the new stream 111E is an audio-only stream, a client device can cause the display of a graphical element 111E' representing a person or object associated with the new stream 111E within the second display area 122. Thus, the second display area 122 can be reserved for audio-only streams and streams having an activity level that does not meet one or more criteria. The graphical element 111E' representing the person associated with the new stream 111E can be represented by a still image of the associated user. A supplemental graphical element 135, such as a colored ring, can also be positioned in proximity to the graphical element 111E' representing a person associated with the new stream 111E. The supplemental graphical element 135 can generate one or more highlights, e.g., change colors or line thickness, when the person associated with the third stream 111C is speaking.

In another embodiment, graphical element 111E' representing the person associated with the new stream 111E can be positioned below the second display area. Thus, the user interface can have a third display area reserved for items that do not have a video stream. An embodiment showing such features is described in more detail below with respect to FIG. 3.

The threshold for the number of depicted users can be based on a number of factors. In addition, a threshold for the number of depicted users can change over time based on a number of factors. For instance, the threshold for the number of depicted users can be based on a number of videos currently rendered in the primary display area. In such embodiments, when there are no videos rendered in the first display area 121, the system may establish a first threshold level, e.g. two people. However, as additional streams are added to a communication session and/or additional renderings are added to the first display area 121, the threshold can increase, e.g., from two to five people, to keep the focus on larger groups of individuals. This feature helps with a number of technical benefits. For example, the primary display area may be utilized more when there are not enough streams to utilize the entire user interface. In addition, it can place higher priority streams ahead of other streams. This is benefit is based on the premise that larger groups of people depicted in a single video stream may have potential for more contributions to a communication session versus streams having fewer people. In addition, there may be a need to scale the renderings of larger groups of people to enable viewers to see details of each person depicted in a single video stream.

Figure 2A:
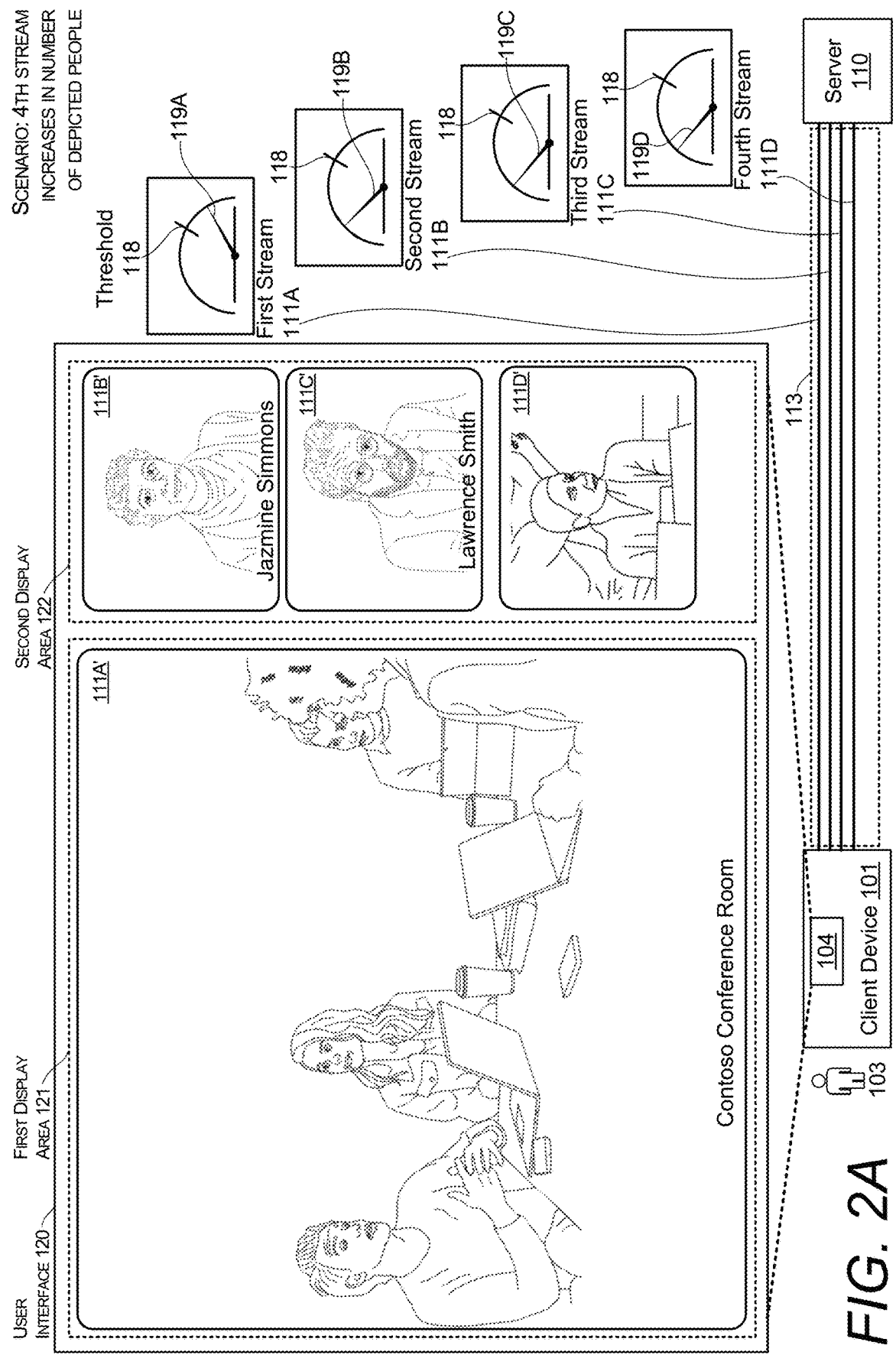
FIG. 2A illustrates aspects of a communication system used in a scenario where a new video stream depicting one person is added to a communication session.

Referring now to FIGS. 2A-2D a user scenario involving a displayed video component depicting a single person transitions to a video component depicting four people. In this example, a video component of a stream, the fourth stream 111D, transitions from a video depicting less than a threshold number of people to depicting more than a threshold number of people. As a result, the system transitions a rendering of the stream from a secondary display area to a first display area. As shown in FIG. 2A, the client device 101 receives four streams: a first stream 111A depicting four people, and three other streams 111B, 111C, 111D depicting a single person. In this example, for illustrative purposes, the threshold 118 is four people.

Figure 2B:
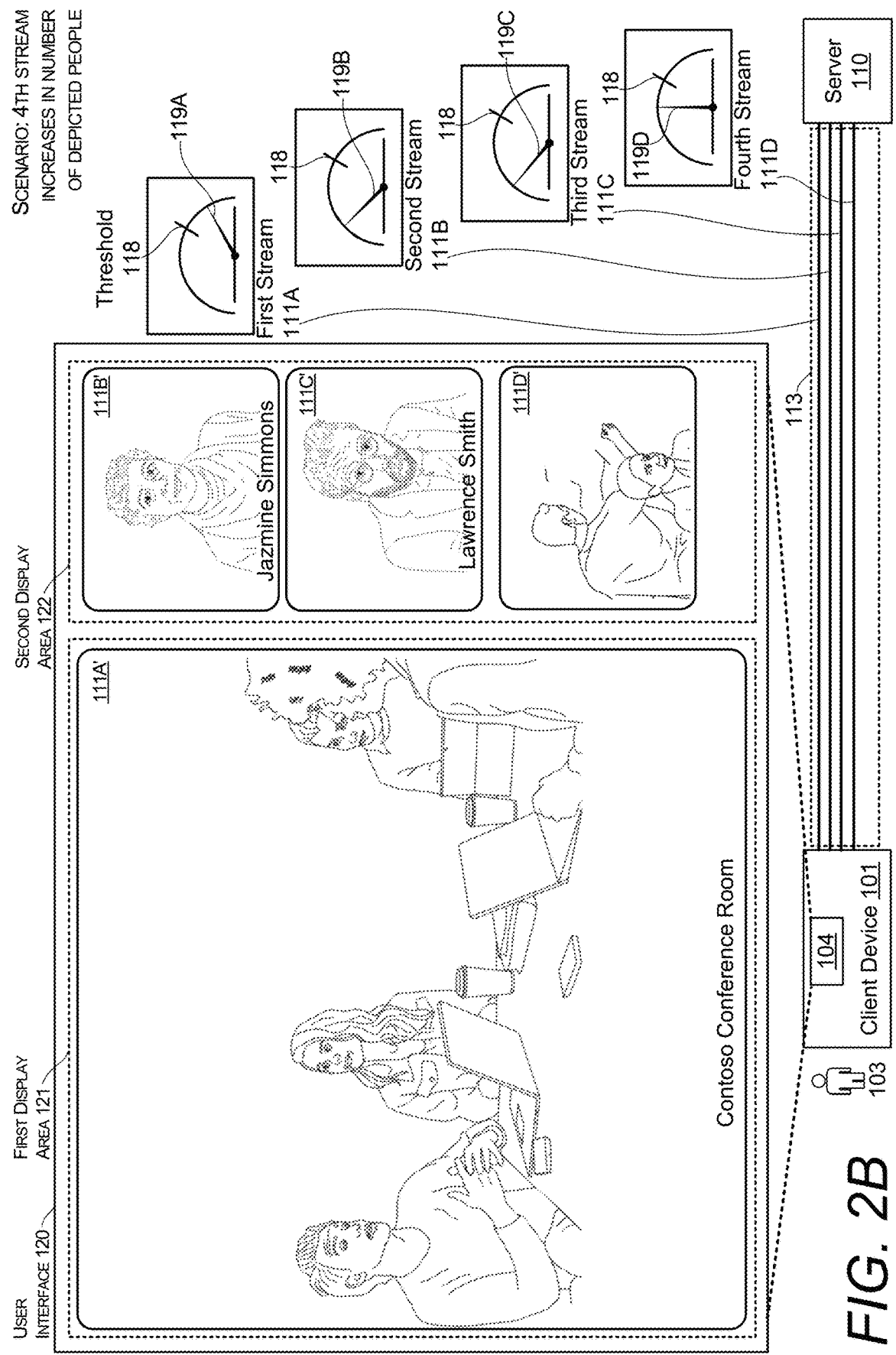
FIG. 2B illustrates aspects of a communication system used in a scenario where the new video stream of FIG. 2A transitions to a zoom level to show two people.

One or more computing devices monitor the streams 111B, 111C, 111D depicting less than the threshold 118 number of individuals 119B. As described herein, the computing devices can utilize any number of technologies to identify people depicted in each stream. As shown in FIG. 2B, the content of the fourth stream 111D changes as the zoom level starts to show more people. From such a transition, the rendering 111D' of the fourth stream 111D remains in the second display area 122 since the number of individuals depicted in the fourth stream 111D remains below the threshold 118.

Figure 2C:
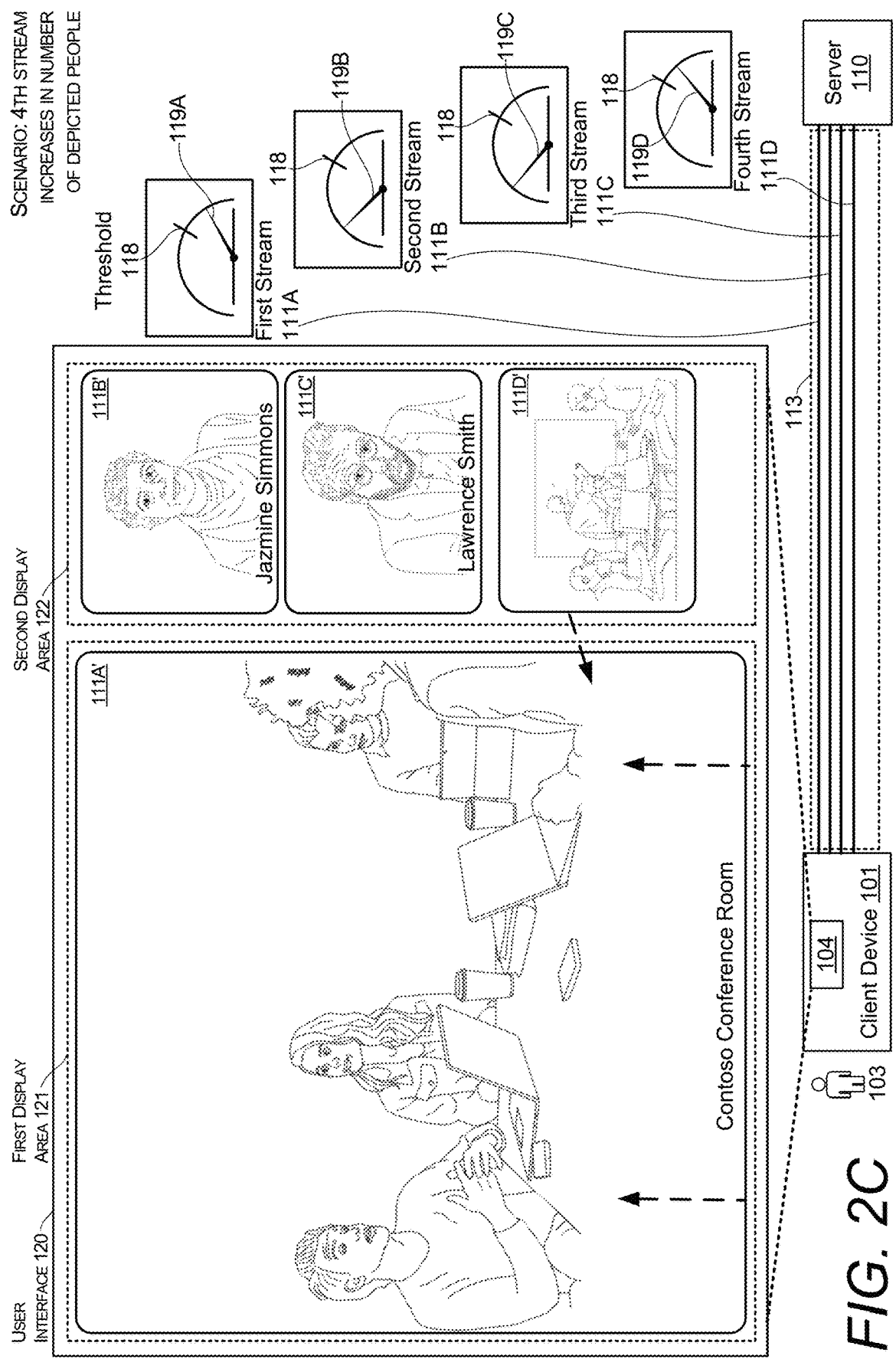
FIG. 2C illustrates aspects of a communication system used in a scenario where the new video stream of FIG. 2A transitions to a zoom level to show at least a threshold number of people.

As shown in FIG. 2C, when the content of the fourth stream 111D changes to depict at least the threshold number of people, e.g., four people, the client device 101 modifies the user interface data 104 causing the user interface 120 to transition the size and position of the rendering 111D' of the fourth stream 111D. In this example, the rendering 111D' is moved from the second display area 122 to the first display area 121.

Figure 2D:
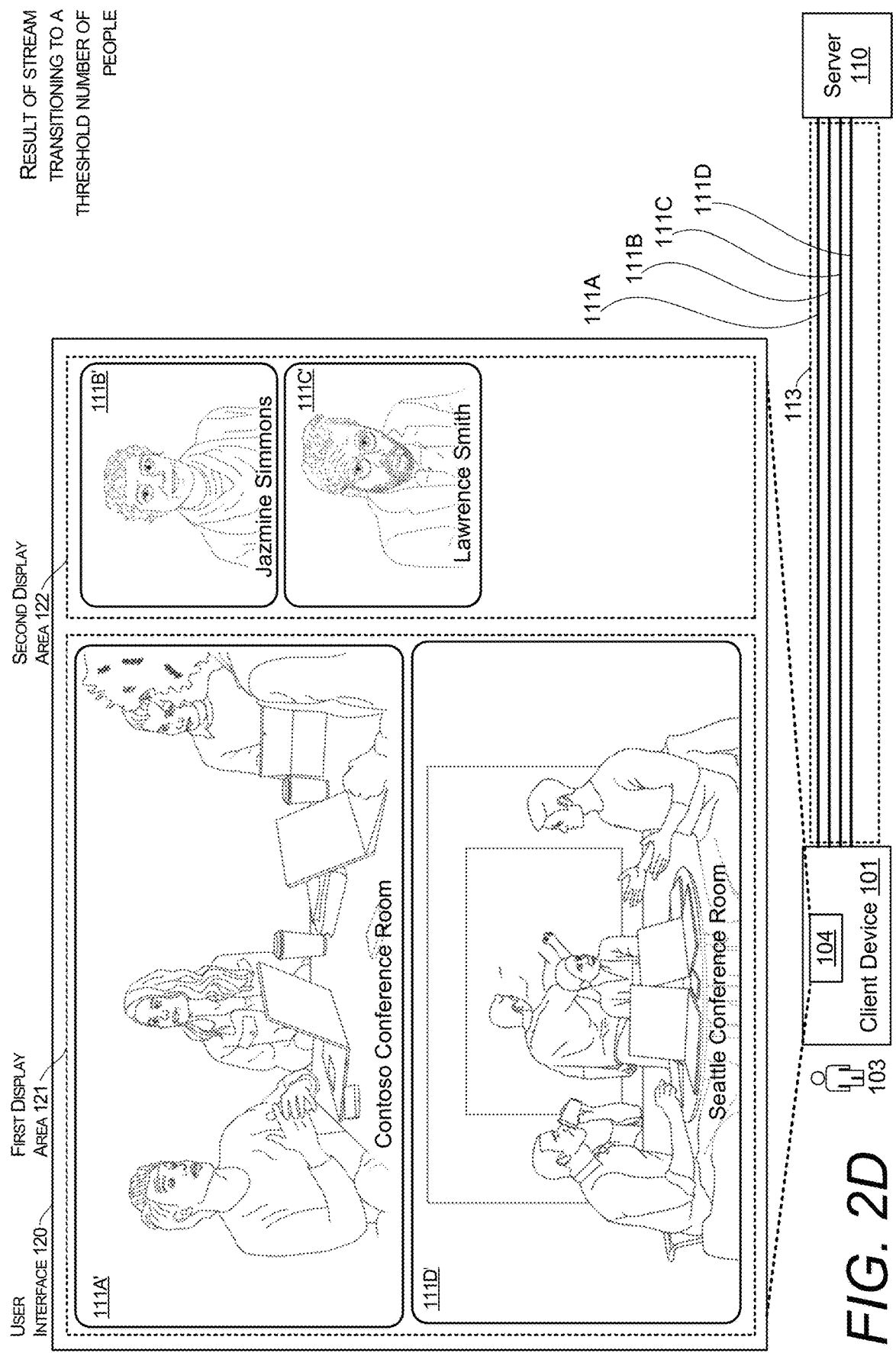
FIG. 2D illustrates aspects of a reconfigured user interface having a primary display area reserved for a rendering of the new video stream depicting at least a threshold number of people.

FIG. 2D illustrates aspects of a reconfigured user interface resulting from the process shown in FIGS. 2A-2C. The user interface 120 has a primary display area 121 reserved for a rendering of a video stream depicting at least a threshold number of people. As shown, the first display area 121 (also referred to herein as a primary display area) is configured to be larger than the second display area 122 (also referred to herein as a secondary display area). This size difference causes a rendering of a stream to be larger when displayed in the first display area versus a rendering of the stream in the second display area. In addition, the system can limit the number of streams that are displayed in the first display area 121 to maintain a size minimum for each rendering. For instance, a client or server can limit the number of renderings in the first display area 121 to two (2) so as to allow for a certain size of each rendering. In some configurations, the location of the first display area 121 can also be in a more prominent position within a user interface 120. For instance, the first display area 121 can be positioned to cover a center point of the user interface, while the second display area 122 can be positioned near the periphery of the user interface and not sized or positioned to cover a center point of a user interface.

Figure 3:
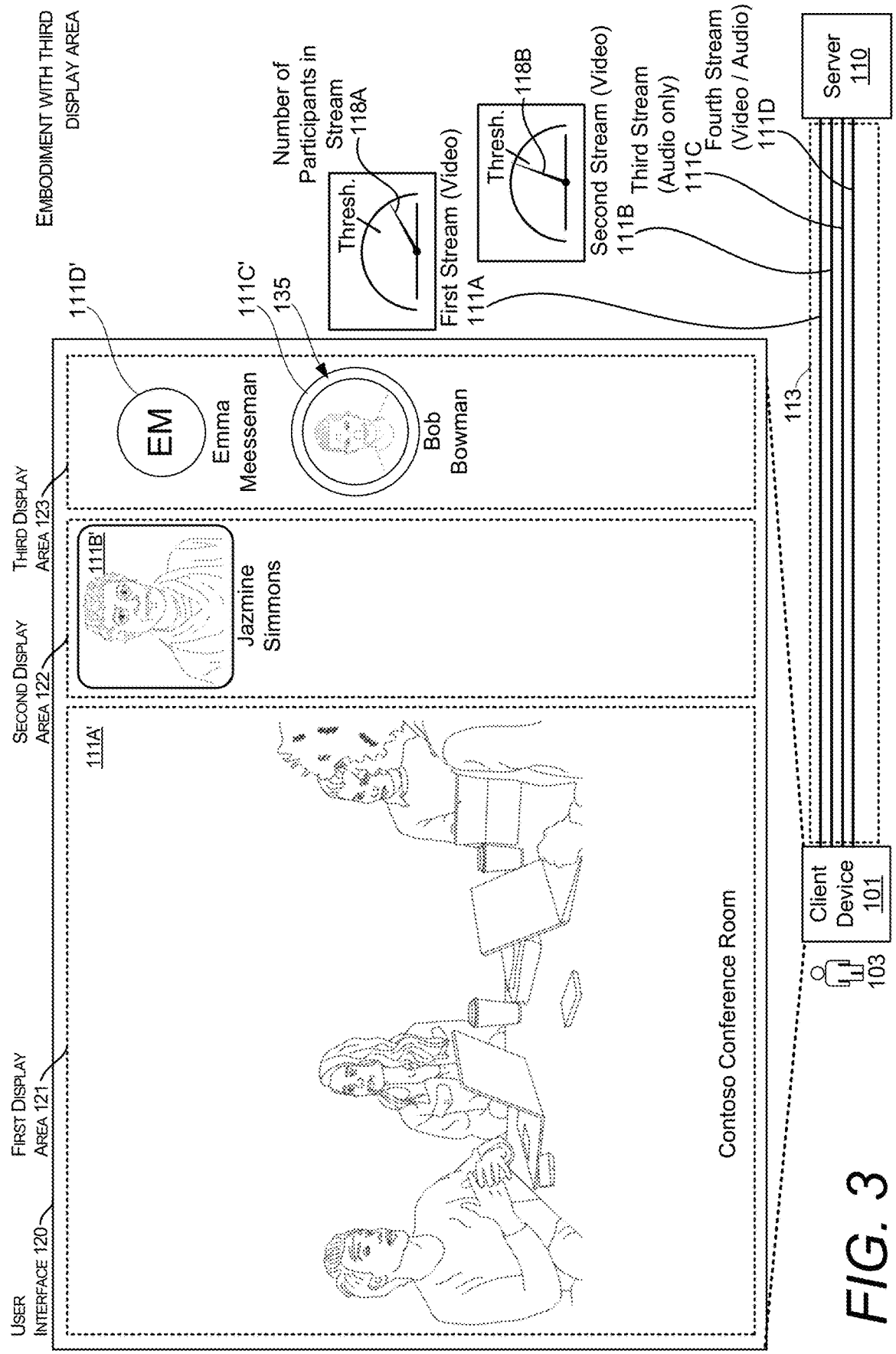
FIG. 3 illustrates aspects of a user interface having first display area, a second display area, and a third display area each reserved for different types of communication streams.

Referring now to FIG. 3 aspects of a user interface having first display area, a second display area, and a third display area reserved for different types of communication streams is shown and described below. In this example, the first display area 121 is reserved for renderings of streams having a threshold number of people depicted in a video component of each stream. The second display area 122 can be reserved for renderings of streams having a live or recorded video feed of a person having less than a threshold number depicted individuals. The third display area 123 can be reserved for graphical elements that represent people or objects of streams having less than a threshold level of activity, or when an audio-only stream is detected. In some configurations, the third display area 123 can include a graphical element showing a person's name, initials, or other identifiers. For instance, in this example, the fourth stream 111D is associated with a video and audio component. A graphical element 111D' representing the fourth stream 111D is rendered within the third display area 123 when the activity of a user depicted within the stream does not meet an activity threshold. This may occur when the system detects that the user depicted within the stream is not moving, not speaking or not preforming a specific gesture. But when the user speaks, moves, or performs a specific gesture, the rendering of the stream may move to the second display area.

A rendering of a stream can also be displayed within the third display area 123 when the stream does not include a video component. In such scenarios, a rendering, such as the rendering 111C' of the third stream 111C, can be represented by a still image of a user. A supplemental graphical element 135, such as a colored ring, can also be positioned in proximity to the representative rendering 111C' of an audio-only stream. The supplemental graphical element 135 can generate one or more highlights, e.g., change colors or line thickness, when the person associated with the third stream 111C is speaking.

These examples are provided for illustrative purposes and are not to be construed as limiting. It can be appreciated that other streams can be represented within the display areas based on one or more characteristics of each stream. Categories of streams, e.g., audio-only streams, low activity level streams, or video and audio streams, can be positioned within each display area and moved as streams transition to different categories over time.

Figure 4A:
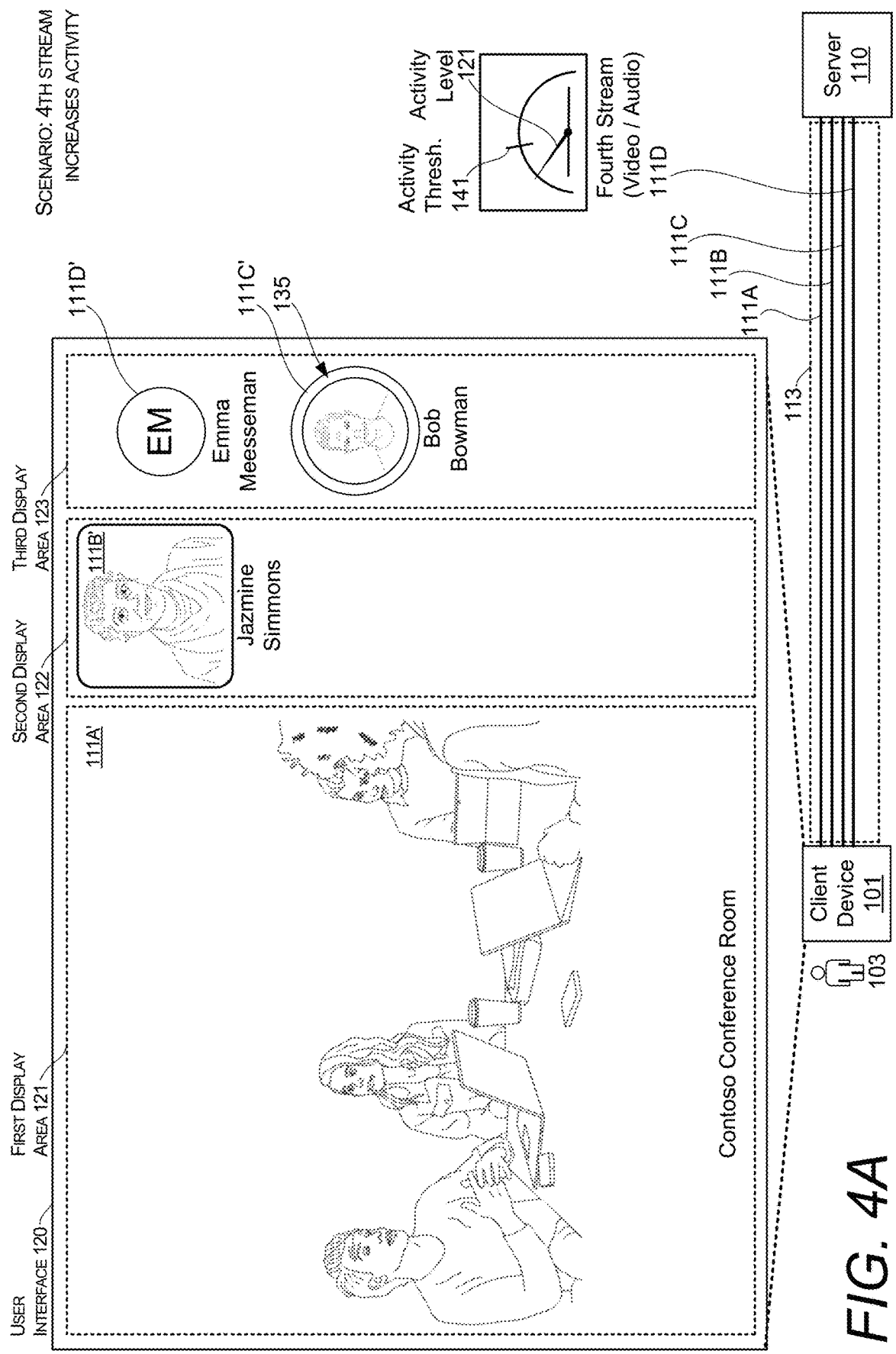
FIG. 4A illustrates aspects of a communication system used in a scenario where a number of different streams are located in various display areas based on a number of individuals depicted in each video stream.
Figure 4B:
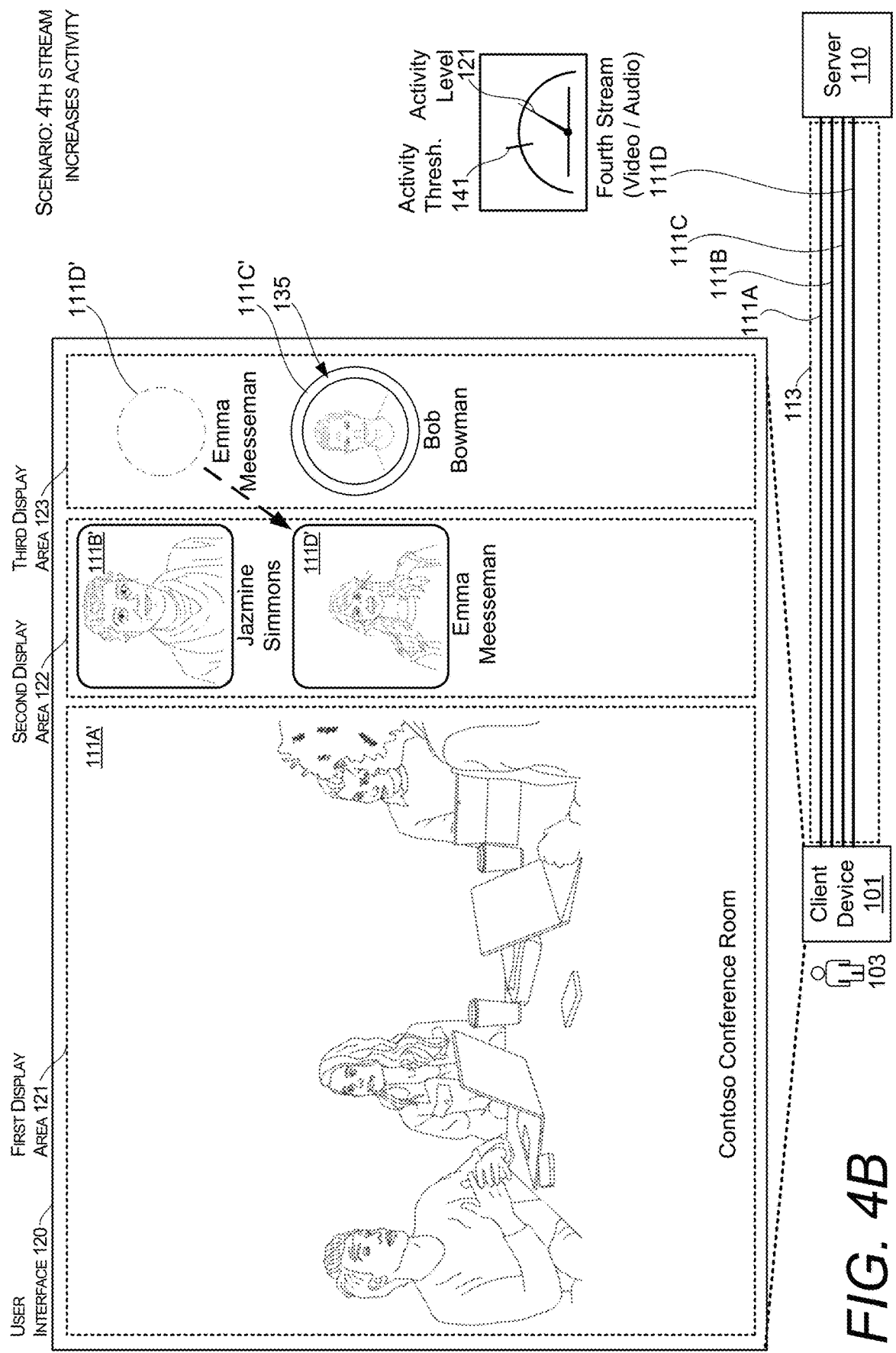
FIG. 4B illustrates aspects of a communication system used in a scenario where an activity level associated with a stream increases to a threshold.
Figure 4C:
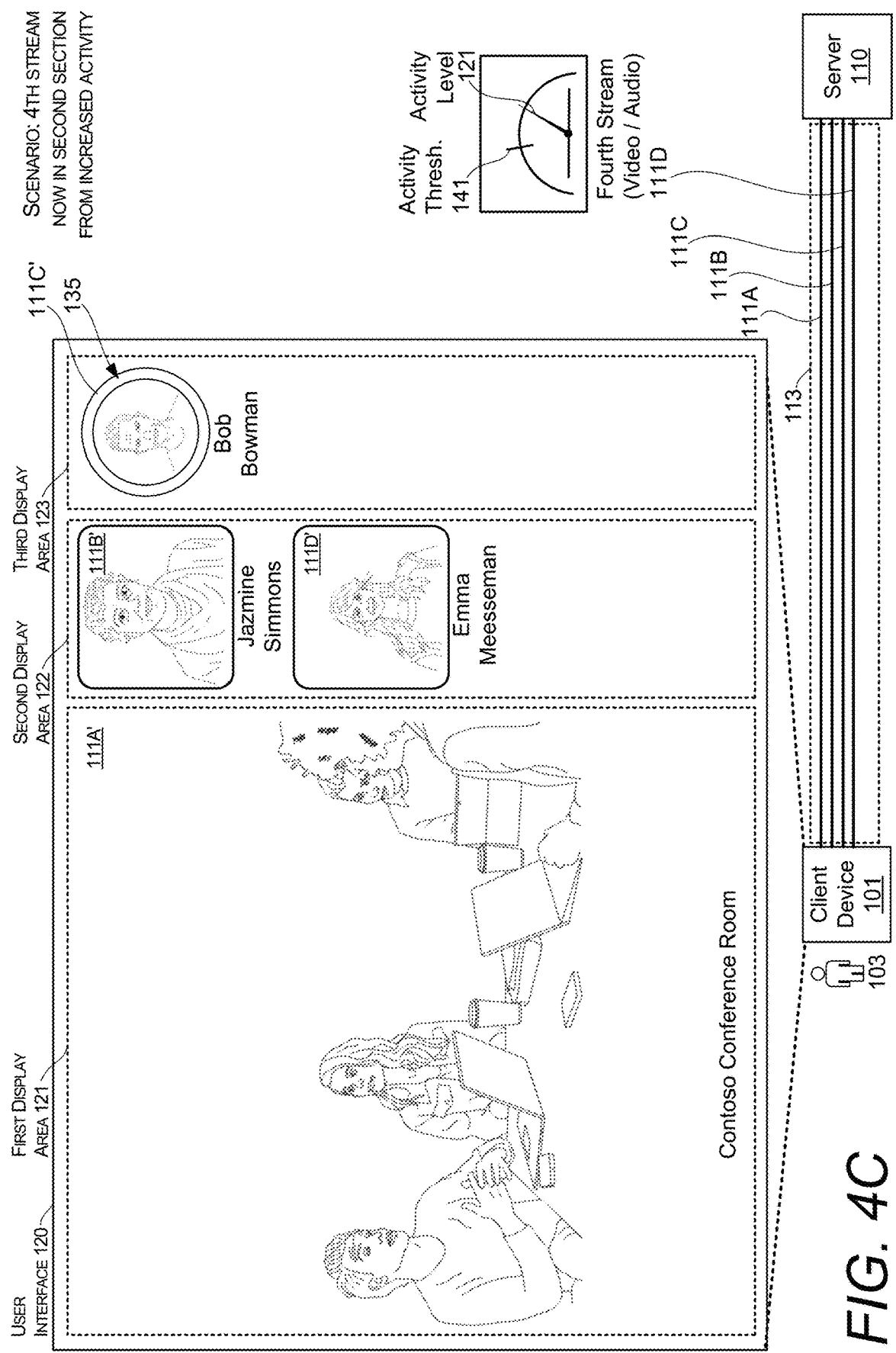
FIG. 4C illustrates aspects of a reconfigured user interface having a display area reserved for a rendering of the video stream having a threshold level of activity.

Referring now to FIGS. 4A-4C a user scenario involving a transition of a stream from a third display area to a second display area is shown and described. As shown in FIG. 4A, a user interface includes first display area, a second display area, and a third display area. Each display area is reserved for different types of communication streams. In this example, the first display area 121 is reserved for renderings of streams having a threshold number of people depicted in a video component of each stream. The second display area 122 can be reserved for renderings of streams having a live or recorded video stream of a person having less than a threshold number depicted individuals. The third display area 123 is reserved for graphical elements that represent people or objects of streams having less than a threshold level of activity or when an audio-only stream is detected.

As shown in FIG. 4A, the first stream 111A comprises a video component depicting at least a threshold number of people, e.g., four people, thus the rendering 111A' of the first stream is displayed within the first display area 121. The second stream comprises a video component depicting less than a threshold number of people. Thus, the rendering 111B' of the second stream is displayed within the second display area 122. The third stream is an audio-only stream. Thus, a rendering of a graphical element 111C' representing the third stream is displayed within the third display area 123. Also shown, the fourth stream 111D is characterized by metadata indicating an activity level associated with the stream. Also, in this example, the fourth stream is an audio and video stream. The activity level can be based on a level of engagement with respect to a person or content associated with the fourth stream. For instance, the activity level may indicate a rate in which someone is speaking, a frequency in which a person is speaking, a volume in which a person is speaking, etc. When the activity level is below a particular activity threshold 141, a graphical element 111D' can be displayed within the third display area 123.

As shown in FIG. 4B, when the activity level 121 of a stream, such as the fourth stream, exceeds the activity threshold 141, the server 120 can generate communication session data 113 causing one or more computers to reconfigure the user interface 120. In this illustrative example, when the activity level of a stream exceeds an activity threshold, the associated graphical element 111D' can be moved from the third display area 123 to the second display area 122. In addition to being moved and/or resized, the graphical element 111D' can transition from a graphical element that is a representation of a user to a live or recorded video stream of the user. FIG. 4C illustrates aspects of a reconfigured user interface resulting from the process shown in FIGS. 4A-4B. As shown, a rendering 111D' of the fourth stream 111D is displayed within the second display area 122. In addition, the rendering can be configured to show a video component of the fourth stream showing the movement of the user.

Figure 5:
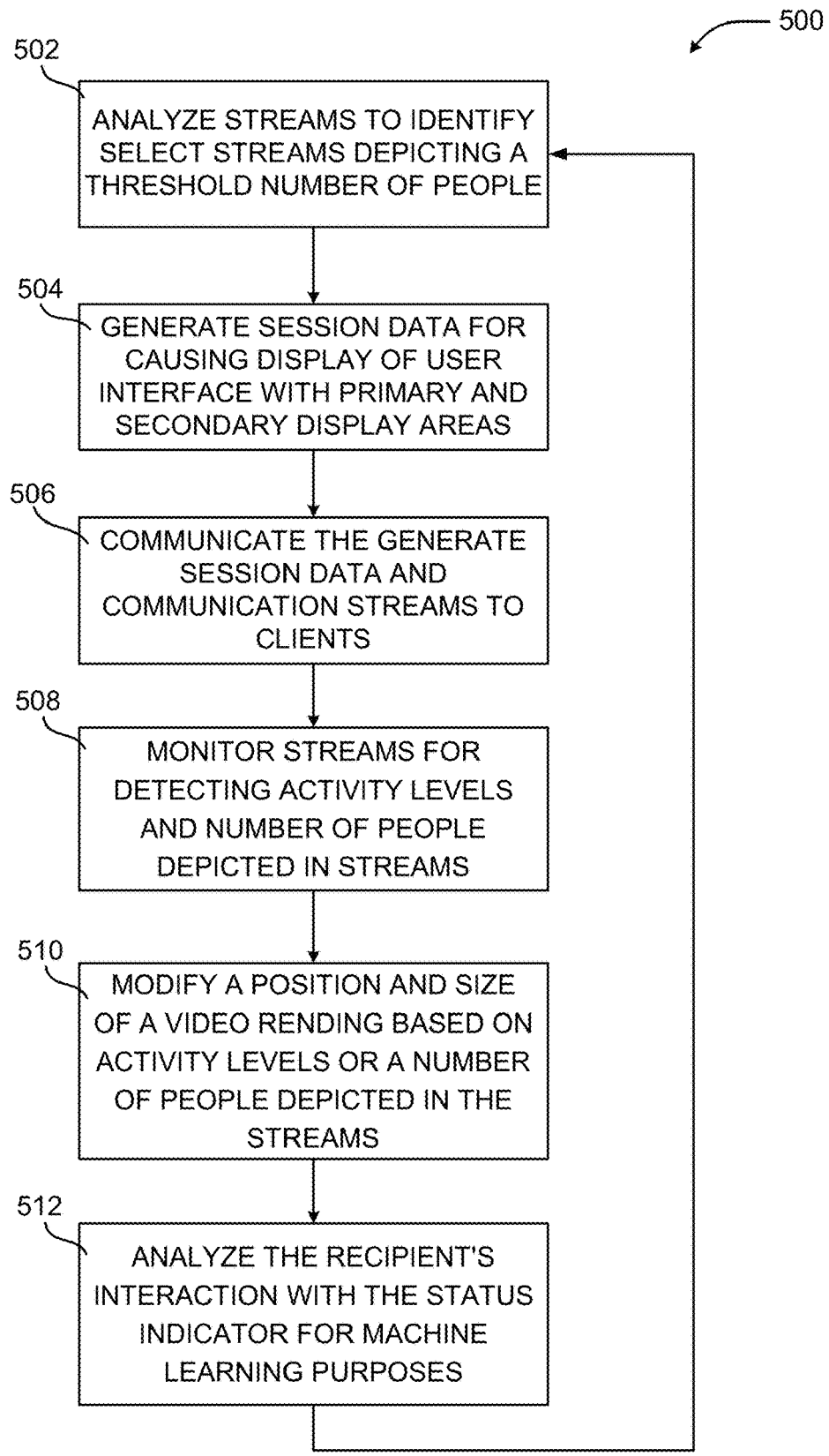
FIG. 5 is a flow diagram illustrating aspects of a routine for computationally efficient generation of a user interface.

FIG. 5 is a diagram illustrating aspects of a routine 500 for improving user engagement and more efficient use of computing resources by providing dynamically controlled view states for communication sessions based on a number of people depicted in video streams. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 5 and the other FIGURES can be implemented in association with the example presentation UIs described above. For instance, the various device(s) and/or module(s) described herein can generate, transmit, receive, and/or display data associated with content of a communication session (e.g., live content, broadcasted event, recorded content, etc.) and/or a presentation UI that includes renderings of one or more participants of remote computing devices, avatars, channels, chat sessions, video streams, images, virtual objects, and/or applications associated with a communication session.

The routine 500 starts at operation 502, where one or more computing devices analyze one or more streams of a communication session to identify select streams depicting a threshold number of people. Operation 502 can utilize a number of different technologies for identifying people within an image or video images. Any suitable facial recognition technologies can be utilized to identify individuals. In addition, any suitable technology for identifying a person by a shape or a specific movement or gesture can be utilized.

People that are identified in a video component of a stream can be filtered from the count of the number of depicted people based on an activity they are engaged in. For instance, the system may only count individuals facing a camera capturing the video images, while individuals were not facing the camera are not counted for a comparison with a threshold. People that are talking may also be counted while other people who are not talking for a period of time are not counted. Different categories of gestures or movement can be identified and individuals who are in a predetermined category of gestures or movement can be counted and compared with a threshold.

The routine 500 proceeds to operation 504, where one or more computing devices generate communication session data 113 for causing one or more remote computers to generate a user interface data 104 having a first display area 121 and a second display area 122, the first display area 121 reserved for the select streams 111A having the video component depicting at least the threshold number 118 of individuals, the second display area 111A designated for other streams 111B of the plurality of streams 111.

Next, at operation 506, the one or more computing devices, such as the server 120 or other computers, communicate the communication session data 113 to one or more clients. The communication session data 113 causes the client computers to generate a user interface data 104 having a first display area 121 and a second display area 122, the first display area 121 reserved for the select streams 111A having the video component depicting at least the threshold number 118 of individuals, the second display area 111A designated for other streams 111B of the plurality of streams 111.

Next, at operation 508, the one or more computing devices monitor the streams for detecting activity levels and changes with respect to the number of people depicted in the streams. One or more technologies can be utilized for detecting a number of people depicted within the streams. For instance, facial recognition or other technologies may be utilized to identify and count individuals within the stream. Activity level changes can involve a volume change within a stream, detection of a person speaking, detection of a rate of speech, or changes within the video content, such as color changes, transitions from a live video stream of person to a rendering of a data file or document.

Next, at operation 510, when the number of individuals depicted in the stream exceeds a threshold, one or more computing devices can modify a position and/or size of a video rendering. A detected change within an activity level or number of people within a stream can cause a rendering of the stream to move from a first region of a user interface to a second region of a user interface. A detected change within an activity level or number of people within a stream can cause a rendering of the stream to be resized. Operation 510 can also involve changes within stream type, such as an audio-only stream transitioning to an audio and video stream.

Next, at operation 512, the system can analyze the user activity for the purposes of collecting, analyzing and using machine learning data. For instance, when a video stream moves from particular display area to another display area, and the viewer interacts with a computer in response to the move, the system can record machine learning data indicating the user's interaction to adjust a threshold, e.g., a threshold number of people for a video, for future streams. For instance, when a system detects that a viewer's eye gaze direction is more focused on a video rendering after a move, the system can raise a priority level with respect to one or more selected thresholds to be used in future streams.

However, if a viewer's eye gaze is less focused, then a system may raise or lower a threshold for future streams.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 6:
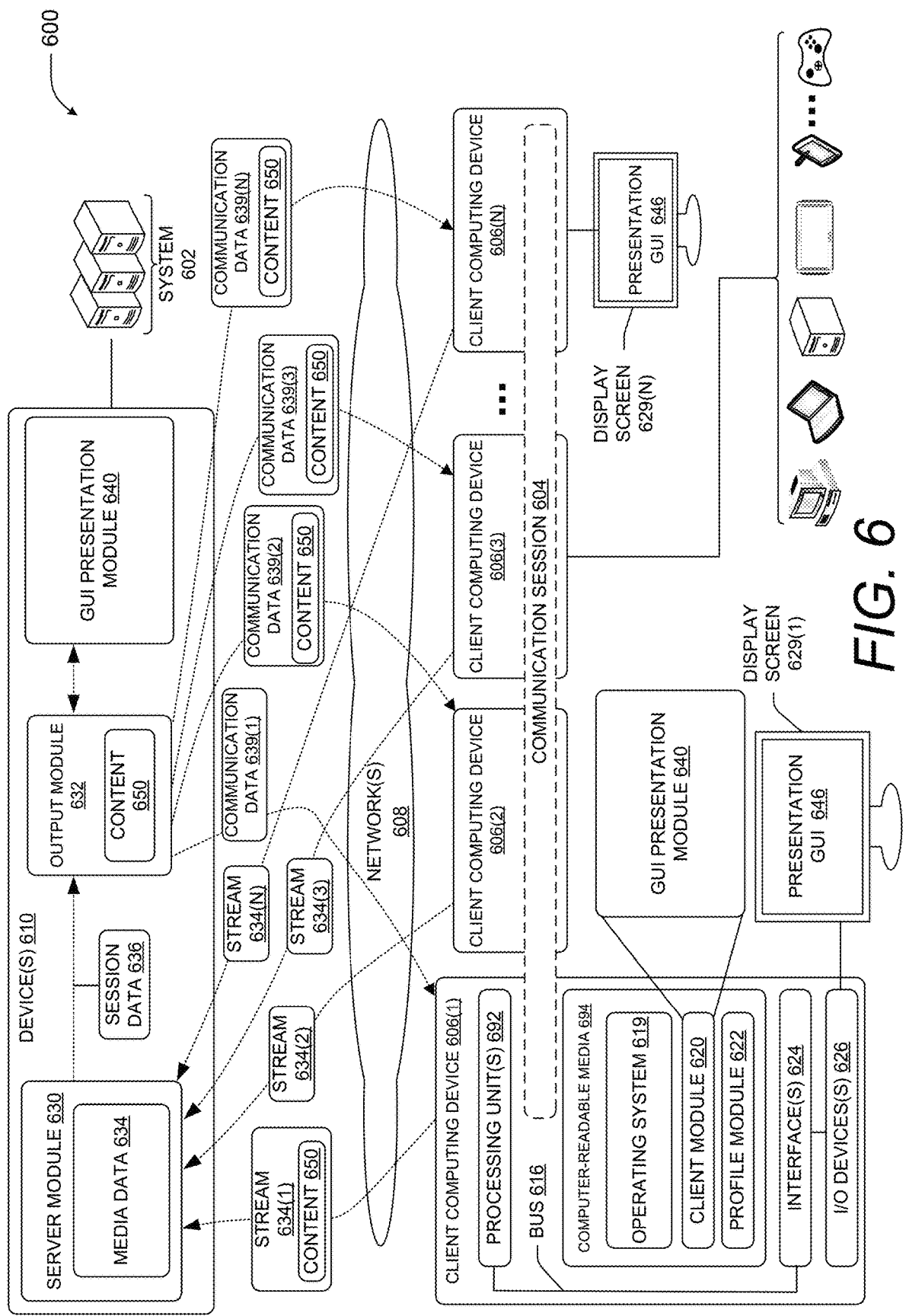
FIG. 6 is a computing system diagram showing aspects of an illustrative operating environment for the technologies disclosed herein.

FIG. 6 is a diagram illustrating an example environment 600 in which a system 602 can implement the techniques disclosed herein. In some implementations, a system 602 may function to collect, analyze, and share data defining one or more objects that are displayed to users of a communication session 604.

As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 6 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 6 illustrates that client computing device 606(1) is in some way connected to a display device (e.g., a display screen 629(N)), which can display a UI according to the techniques described herein.

In the example environment 600 of FIG. 6, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 6) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 6, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such a image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different than the general communication session.

Figure 7:
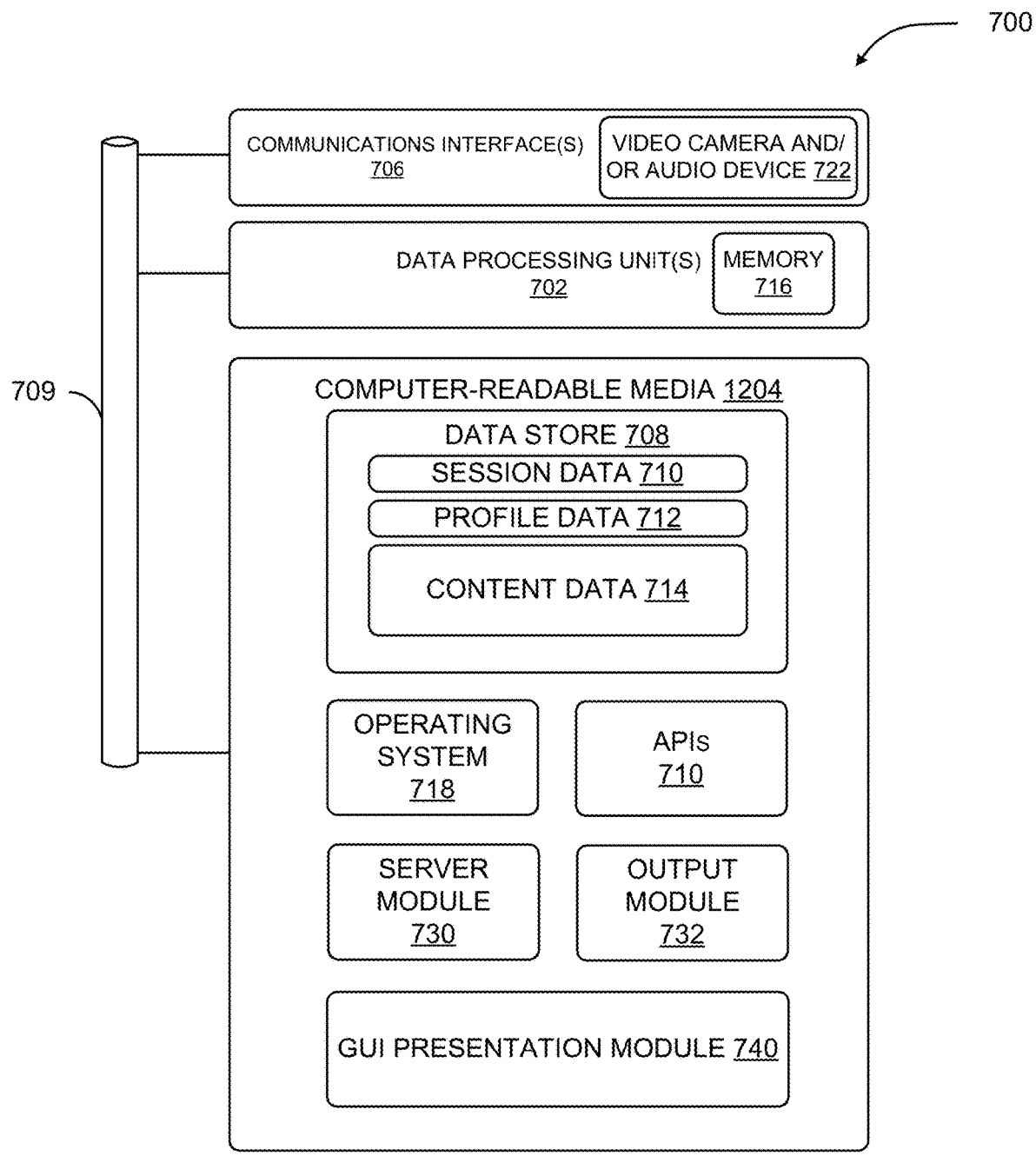
FIG. 7 is a computing architecture diagram showing aspects of the configuration and operation of a computing device that can implement aspects of the technologies disclosed herein.

FIG. 7 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 6), profile data 712 (e.g., associated with a participant profile), and/or other data. The session data 710 can include a total number of participants (e.g., users and/or client computing devices) in a communication session, activity that occurs in the communication session, a list of invitees to the communication session, and/or other data related to when and how the communication session is conducted or hosted. The data store 708 may also include content data 714, such as the content that includes video, audio, or other content for rendering and display on one or more of the display screens 629.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary higher or lower. That is, functionality described herein in association with the illustrated modules may be performed by a fewer number of modules or a larger number of modules on one device or spread across multiple devices.

The disclosure presented herein also encompasses the subject matter set forth in the following clauses.

Example Clause A

A method to be performed by a data processing system 110, the method comprising: analyzing a plurality of streams 111 to identify select streams having a video component depicting at least a threshold 118 number of individuals 119A; generating communication session data 113 for causing a generation of a user interface having a first display area 121 and a second display area 122, the first display area 121 reserved for the select streams 111A having the video component depicting at least the threshold number 118 of individuals, the second display area 111A designated for other streams 111B of the plurality of streams 111; and transmitting the communication session data 113 comprising the plurality of streams 111 to a plurality of client computing devices 101, the communication session data 113 causing at least one client computing device 101 to generate a display of a user interface 120 having the first display area 121 reserved for renderings 111A' of the select streams 111A having the video component depicting at least the threshold 118 number of individuals 119A and the second display area 122 designated for additional renderings 111B' of other streams 111B depicting less than the threshold 118 number of individuals 119B.

Example Clause B

The method of clause A, further comprising: detecting an addition of a new stream 111C; analyzing the new stream 111C to determine that the number of individuals 119C depicted in the video component of the new stream 111C is less than the threshold 118; and in response to determining that the number of individuals 119C does not exceed the threshold 118, configuring the communication session data 113 to cause the at least one client computing device a display of a rendering 111C' of the new stream 111C within the second display area 122.

Example Clause C

The method of clauses A and B, further comprising: detecting an addition of a new stream 111D; analyzing the new stream 111D to determine that the number of individuals 119D depicted in the video component of the new stream 111D exceeds the threshold 118; and in response to determining that the number of individuals 119D depicted in the video component of the new stream 111D exceeds the threshold 118, configuring the communication session data 113 to cause the at least one client computing device a display of a rendering 111D' of the new stream 111D within the first display area 121.

Example Clause D

The method of clauses A through C, further comprising: detecting an addition of a new stream 111E; analyzing the new stream 111E to determine that the new stream 111E comprises an audio component without a live video component; and in response to determining that the new stream 111E comprises the audio component without the live video component, configuring the communication session data 113 to cause the at least one client computing device a display of a graphical element 111E' representing a person associated with the new stream 111E within the second display area 122.

Example Clause E

The method of clauses A through D, wherein the plurality of streams 111 comprises an additional stream 111C FIG. 2, wherein the method further comprises: monitoring the other streams 111B, 111C, 111D depicting less than the threshold 118 number of individuals 119B to determine if a single stream of the other streams 111B, 111C, 111D starts to include a video component depicting at least the threshold number 118 of individuals; and in response to determining if the single stream 111D starts to include the video component depicting at least the threshold number 118 of individuals, transitioning a rendering 111D' of the single stream 111D from the second display area 122 to the first display area 121.

Example Clause F

The method of clauses A through E, wherein the plurality of streams 111 comprises an additional stream 111C FIG. 3, wherein the method further comprises: analyzing the additional stream 111C FIG. 3 to determine that the additional stream 111C comprises an audio component without a live video component; and in response to determining that the additional stream 111C FIG. 3 comprises the audio component without the live video component, configuring the communication session data 113 to cause the at least one client computing device a display a rendering of a graphical element 111C' representing a status of the new stream 111C FIG. 3 within a third display area 123 that is separate from the second display area 122 and the first display area 121.

Example Clause G

The method of clauses A through F, wherein the plurality of streams 111 comprises an additional stream 111D FIG. 3, wherein the method further comprises: analyzing the additional stream 111D FIG. 3 to determine an activity level of the audio component or the video component of the additional stream 111D FIG. 3; determining that the activity level of the audio component or the video component of the additional stream is below an activity level threshold; and in response to determining that the activity level of the audio component or the video component of the additional stream is below the activity level threshold, configuring the communication session data 113 to cause the at least one client computing device to a display of a graphical element 111D' representing the additional stream 111D FIG. 3 within a third display area 123, wherein the second display area 122 being positioned between the first display area 121 and the third display area 123.

Example Clause H

The method of clauses A through G, wherein the plurality of streams 111 comprises an additional stream 111D FIG. 3, wherein the method further comprises: monitoring the additional stream 111D FIG. 3 to determine that an activity level of the audio component or the video component of the additional stream begins to exceed an activity level threshold; and in response to determining that the activity level of the audio component or the video component of the additional stream begins to exceed the activity level threshold, transitioning a rendering 111D' of the additional stream 111D from a third display area 123 to the second display area 121.

Example Clause I

The method of clauses A through H, wherein a scaling factor is applied to the renderings of the select streams to bring a size of at least one individual depicted in the video component of the select streams within a threshold difference compared to a size of at least one individual depicted in the video component of the other streams.

Example Clause J

A system 606, comprising: one or more processing units 692; and a computer-readable medium 694 having encoded thereon computer-executable instructions to cause the one or more processing units 692 to: receive a plurality of streams 111, individual streams of the plurality of streams 111 comprising at least one of a video component and an audio component of a communication session; identify select streams of the plurality of streams 111, the select streams having at least a threshold number 118 of individuals 119A depicted in an associated video component; and cause a display of a user interface 120 having a first display area 121 and a second display area 122, wherein the first display area 121 is reserved for renderings 111A' of the select streams 111A having the video component depicting at least the threshold 118 number of individuals 119A and the second display area 122 designated for additional renderings 111B' of other streams 111B depicting less than the threshold 118 number of individuals 119B.

Example Clause K

The system of clause J, wherein the selected streams are identified based on at least one of metadata identifying a number of individuals depicted in the video component of the select streams, an analysis of the selected streams to identify individuals depicted in the video component of the select streams.

Example Clause L

The system of clauses J and K, wherein the instructions further cause the one or more processing units to: determine that a number of individuals 119C depicted in the video component of the new stream 111C is less than the threshold 118; and display of a rendering 111C' of the new stream 111C within the second display area 122, in response to determining that the number of individuals 119C depicted in the video component of the new stream 111C is less than the threshold 118.

Example Clause M

The system of clauses J through L, wherein the instructions further cause the one or more processing units to: determine that the number of individuals 119D depicted in the video component of the new stream 111D exceeds the threshold 118; and display of a rendering 111D' of the new stream 111D within the first display area 121, in response to determining that the number of individuals 119D depicted in the video component of the new stream 111D exceeds the threshold 118.

Example Clause N

The system of clauses J through M, wherein the instructions further cause the one or more processing units to: determine that the new stream 111E comprises an audio component without a live video component; and display of a graphical element 111E' representing a person associated with the new stream 111E within the second display area 122, in response to determining that the new stream 111E comprises the audio component without the live video component.

Example Clause O

A system 110, comprising: means for analyzing a plurality of streams 111 to identify select streams having a video component depicting at least a threshold 118 number of individuals 119A; means for generating communication session data 113 for causing one or more remote computers to generate a user interface data 104 having a first display area 121 and a second display area 122, the first display area 121 reserved for the select streams 111A having the video component depicting at least the threshold number 118 of individuals, the second display area 111A designated for other streams 111B of the plurality of streams 111; and means for transmitting the communication session data 113 comprising the plurality of streams 111 to a plurality of client computing devices 101, the communication session data 113 causing at least one client computing device 101 to generate a display of a user interface 120 having the first display area 121 reserved for renderings 111A' of the select streams 111A having the video component depicting at least the threshold 118 number of individuals 119A and the second display area 122 designated for additional renderings 111B' of other streams 111B depicting less than the threshold 118 number of individuals 119B.

Example Clause P

The system of clause O, further comprising: means for detecting an addition of a new stream 111C; means for analyzing the new stream 111C to determine that the number of individuals 119C depicted in the video component of the new stream 111C is less than the threshold 118; and means for configuring the communication session data 113 to cause the at least one client computing device a display of a rendering 111C' of the new stream 111C within the second display area 122, wherein the communication session data 113 is configured in response to determining that the number of individuals 119C does not exceed the threshold 118.

Example Clause Q

The system of clauses O and P, further comprising: means for detecting an addition of a new stream 111D; means for analyzing the new stream 111D to determine that the number of individuals 119D depicted in the video component of the new stream 111D exceeds the threshold 118; and means for configuring the communication session data 113 to cause the at least one client computing device a display of a rendering 111D' of the new stream 111D within the first display area 121, wherein the communication session data 113 is configured in response to determining that the number of individuals 119D depicted in the video component of the new stream 111D exceeds the threshold 118.

Example Clause R

The system of clauses O through Q, further comprising: means for detecting an addition of a new stream 111E;

means for analyzing the new stream 111E to determine that the new stream 111E comprises an audio component without a live video component; and means for configuring the communication session data 113 to cause the at least one client computing device a display of a graphical element 111E' representing a person associated with the new stream 111E within the second display area 122, the communication session data 113 being configured in response to determining that the new stream 111E comprises the audio component without the live video component.

Example Clause S

The system of clauses O through R, wherein the plurality of streams 111 comprises an additional stream 111C FIG. 2, wherein the method further comprises: means for monitoring the other streams 111B, 111C, 111D depicting less than the threshold 118 number of individuals 119B to determine if a single stream of the other streams 111B, 111C, 111D starts to include a video component depicting at least the threshold number 118 of individuals; and means for transitioning a rendering 111D' of the single stream 111D from the second display area 122 to the first display area 121, the transition occurring in response to the single stream 111D including the video component depicting at least the threshold number 118 of individuals.

Example Clause T

The system of clauses O through S, wherein the plurality of streams 111 comprises an additional stream 111C FIG. 3, wherein the method further comprises: means for analyzing the additional stream 111C FIG. 3 to determine that the additional stream 111C comprises an audio component without a live video component; and means for configuring the communication session data 113 to cause the at least one client computing device a display a rendering of a graphical element 111C' representing a status of the new stream 111C FIG. 3 within a third display area 123 that is separate from the second display area 122 and the first display area 121, the communication session data configured in response to determining that the additional stream 111C FIG. 3 comprises the audio component without the live video component.

It should also be appreciated that many variations and modifications may be made to the above-described examples, the elements of which are to be understood as being among other acceptable examples. All such modifications and variations are intended to be included herein within the scope of this disclosure and protected by the following claims.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method to be performed by a data processing system, the method comprising:
analyzing a plurality of streams to identify select streams having a video component depicting at least a threshold number of individuals;
generating communication session data for causing a generation of a user interface having a first display area and a second display area, the first display area reserved for the select streams having the video component depicting at least the threshold number of individuals within individual renderings, the second display area designated for other streams of the plurality of streams; and
transmitting the communication session data comprising the plurality of streams to a plurality of client computing devices, the communication session data causing at least one client computing device to generate a display of a user interface having the first display area reserved for a first set of renderings of the select streams where each of the select streams causes a display of the individual renderings each depicting at least the threshold number of individuals and the second display area designated for a second set of renderings of other streams where each of the other streams causes a display of other individual renderings each depicting less than the threshold number of individuals.

2. The method of claim 1, further comprising:
detecting an addition of a new stream;
analyzing the new stream to determine that the number of individuals depicted in the video component of the new stream is less than the threshold; and
in response to determining that the number of individuals does not exceed the threshold, configuring the communication session data to cause the at least one client computing device a display of a rendering of the new stream within the second display area.

3. The method of claim 1, further comprising:
detecting an addition of a new stream;
analyzing the new stream to determine that the number of individuals depicted in the video component of the new stream exceeds the threshold; and
in response to determining that the number of individuals depicted in the video component of the new stream exceeds the threshold, configuring the communication session data to cause the at least one client computing device a display of a rendering of the new stream within the first display area.

4. The method of claim 1, further comprising:
detecting an addition of a new stream;
analyzing the new stream to determine that the new stream comprises an audio component without a live video component; and
in response to determining that the new stream comprises the audio component without the live video component, configuring the communication session data to cause the at least one client computing device a display of a graphical element representing a person associated with the new stream within the second display area.

5. The method of claim 1, wherein the plurality of streams comprises an additional stream, wherein the method further comprises:
monitoring the other streams depicting less than the threshold number of individuals to determine if a single stream of the other streams starts to include a video component depicting at least the threshold number of individuals; and
in response to determining if the single stream starts to include the video component depicting at least the threshold number of individuals, transitioning a rendering of the single stream from the second display area to the first display area.

6. The method of claim 1, wherein the plurality of streams comprises an additional stream, wherein the method further comprises:

analyzing the additional stream to determine that the additional stream comprises an audio component without a live video component; and in response to determining that the additional stream comprises the audio component without the live video component, configuring the communication session data to cause the at least one client computing device to display a rendering of a graphical element representing a status of the new stream within a third display area that is separate from the second display area and the first display area.

7. The method of claim 1, wherein the plurality of streams comprises an additional stream, wherein the method further comprises:

analyzing the additional stream to determine an activity level of the audio component or the video component of the additional stream;

determining that the activity level of the audio component or the video component of the additional stream is below an activity level threshold; and in response to determining that the activity level of the audio component or the video component of the additional stream is below the activity level threshold, configuring the communication session data to cause the at least one client computing device to a display of a graphical element representing the additional stream within a third display area, wherein the second display area being positioned between the first display area and the third display area.

8. The method of claim 1, wherein the plurality of streams comprises an additional stream, wherein the method further comprises:

monitoring the additional stream to determine that an activity level of the audio component or the video component of the additional stream begins to exceed an activity level threshold; and in response to determining that the activity level of the audio component or the video component of the additional stream begins to exceed the activity level threshold, transitioning a rendering of the additional stream from a third display area to the second display area.

9. The method of claim 1, wherein a scaling factor is applied to the renderings of the select streams to bring a size of at least one individual depicted in the video component of the select streams within a threshold difference compared to a size of at least one individual depicted in the video component of the other streams.

10. A system, comprising:

one or more processing units; and a non-transitory computer-readable medium having encoded thereon computer-executable instructions to cause the one or more processing units to:

receive a plurality of streams, individual streams of the plurality of streams comprising at least one of a video component and an audio component of a communication session;

identify select streams of the plurality of streams, the select streams having at least a threshold number of individuals within individual renderings depicted in an associated video component; and cause a display of a user interface having a first display area and a second display area, wherein the first display area is reserved for a first set of renderings of the select streams where each of the select streams causes a display of the individual renderings each depicting at least the threshold number of individuals within individual renderings and the second display area designated for a second set of renderings of other streams where each of the other streams causes a display of other individual renderings each depicting less than the threshold number of individuals.

11. The system of claim 10, wherein the selected streams are identified based on at least one of metadata identifying a number of individuals depicted in the video component of the select streams, and an analysis of the selected streams to identify individuals depicted in the video component of the select streams.

12. The system of claim 10, wherein the instructions further cause the one or more processing units to:

determine that a number of individuals depicted in the video component of the new stream is less than the threshold; and display of a rendering of the new stream within the second display area, in response to determining that the number of individuals depicted in the video component of the new stream is less than the threshold.

13. The system of claim 10, wherein the instructions further cause the one or more processing units to:

determine that the number of individuals depicted in the video component of the new stream exceeds the threshold; and display of a rendering of the new stream within the first display area, in response to determining that the number of individuals depicted in the video component of the new stream exceeds the threshold.

14. The system of claim 10, wherein the instructions further cause the one or more processing units to:

determine that the new stream comprises an audio component without a live video component; and display of a graphical element representing a person associated with the new stream within the second display area, in response to determining that the new stream comprises the audio component without the live video component.

15. A system, comprising:

means for analyzing a plurality of streams to identify select streams having a video component depicting at least a threshold number of individuals;

means for generating communication session data for causing one or more remote computers to generate a user interface data having a first display area and a second display area, the first display area reserved for the select streams having the video component depicting at least the threshold number of individuals within individual renderings, the second display area designated for other streams of the plurality of streams; and means for transmitting the communication session data comprising the plurality of streams to a plurality of client computing devices, the communication session data causing at least one client computing device to generate a display of a user interface having the first display area reserved for a first set of renderings of the select streams where each of the select streams causes a display of the individual renderings each depicting at least the threshold number of individuals and the second display area designated for a second set of renderings of other streams where each of the other streams causes a display of other individual renderings each depicting less than the threshold number of individuals.

16. The system of claim 15, further comprising:

means for detecting an addition of a new stream;

means for analyzing the new stream to determine that the number of individuals depicted in the video component of the new stream is less than the threshold; and means for configuring the communication session data to cause the at least one client computing device a display of a rendering of the new stream within the second display area, wherein the communication session data is configured in response to determining that the number of individuals does not exceed the threshold.

17. The system of claim 15, further comprising:
means for detecting an addition of a new stream;
means for analyzing the new stream to determine that the number of individuals depicted in the video component of the new stream exceeds the threshold; and
means for configuring the communication session data to cause the at least one client computing device a display of a rendering of the new stream within the first display area, wherein the communication session data is configured in response to determining that the number of individuals depicted in the video component of the new stream exceeds the threshold.

18. The system of claim 15, further comprising:
means for detecting an addition of a new stream;
means for analyzing the new stream to determine that the new stream comprises an audio component without a live video component; and
means for configuring the communication session data to cause the at least one client computing device a display of a graphical element representing a person associated with the new stream within the second display area, the communication session data being configured in response to determining that the new stream comprises the audio component without the live video component.

19. The system of claim 15, wherein the plurality of streams comprises an additional stream, wherein the method further comprises:
means for monitoring the other streams depicting less than the threshold number of individuals to determine if a single stream of the other streams starts to include a video component depicting at least the threshold number of individuals; and
means for transitioning a rendering of the single stream from the second display area to the first display area, the transition occurring in response to the single stream including the video component depicting at least the threshold number of individuals.

20. The system of claim 15, wherein the plurality of streams comprises an additional stream, wherein the method further comprises:
means for analyzing the additional stream to determine that the additional stream comprises an audio component without a live video component; and
means for configuring the communication session data to cause the at least one client computing device to display a rendering of a graphical element representing a status of the new stream within a third display area that is separate from the second display area and the first display area, the communication session data configured in response to determining that the additional stream comprises the audio component without the live video component.

* * * * *